US008948705B2

(12) United States Patent
Walton et al.

(10) Patent No.: US 8,948,705 B2
(45) Date of Patent: Feb. 3, 2015

(54) MULTIPLE-ACCESS HYBRID OFDM-CDMA SYSTEM

(75) Inventors: Jay R. Walton, Carlisle, MA (US); John W. Ketchum, Harvard, MA (US); Steven J. Howard, Ashland, MA (US); Mark Wallace, Bedford, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/227,946

(22) Filed: Sep. 8, 2011

(65) Prior Publication Data

US 2011/0317671 A1 Dec. 29, 2011

Related U.S. Application Data

(60) Continuation of application No. 10/696,208, filed on Oct. 29, 2003, now Pat. No. 8,427,936, which is a division of application No. 09/982,280, filed on Oct. 18, 2001, now abandoned.

(51) Int. Cl.
*H04B 1/00* (2006.01)
*H04B 7/00* (2006.01)
(Continued)

(52) U.S. Cl.
CPC ............... *H04W 52/12* (2013.01); *H04B 1/692* (2013.01); *H04L 5/0021* (2013.01);
(Continued)

(58) Field of Classification Search
CPC ... H04H 20/31; H04B 7/005; H04M 3/42195; H04L 5/0007; H04L 27/2647; H04L 27/2662
USPC ............ 455/70; 370/203, 208, 210, 320, 336, 370/342, 343, 344, 329, 259, 280; 375/260, 375/299, 141, 208, 259, 340, 222, 233; 708/422; 382/100
See application file for complete search history.

(56) References Cited

U.S. PATENT DOCUMENTS 5,056,109 A 10/1991 Gilhousen et al.
5,101,501 A 3/1992 Gilhousen et al.
(Continued)

FOREIGN PATENT DOCUMENTS

| EP | 1128592 | 8/2001 |
| JP | 07038496 | 2/1995 |
| WO | WO0120840 A1 | 3/2001 |

OTHER PUBLICATIONS

European Search Report—EP07024455—Search Authority—Munich–Jan. 24, 2008.
(Continued)

*Primary Examiner* — William D Cumming
(74) *Attorney, Agent, or Firm* — QUALCOMM IP Department; James Hunt Yancey, Jr.

(57) ABSTRACT

In one aspect of a multiple-access OFDM-CDMA system, data spreading is performed in the frequency domain by spreading each data stream with a respective spreading code selected from a set of available spreading codes. To support multiple access, system resources may be allocated and de-allocated to users (e.g., spreading codes may be assigned to users as needed, and transmit power may be allocated to users). Variable rate data for each user may be supported via a combination of spreading adjustment and transmit power scaling. Interference control techniques are also provided to improve system performance via power control of the downlink and/or uplink transmissions to achieve the desired level of performance while minimizing interference. A pilot may be transmitted by each transmitter unit to assist the receiver units perform acquisition, timing synchronization, carrier recovery, handoff, channel estimation, coherent data demodulation, and so on.

37 Claims, 10 Drawing Sheets

(51) Int. Cl.

| | | |
|---|---|---|
| H04W 52/12 | (2009.01) | |
| H04B 1/692 | (2011.01) | |
| H04L 5/00 | (2006.01) | |
| H04L 5/02 | (2006.01) | |
| H04L 27/00 | (2006.01) | |
| H04L 27/26 | (2006.01) | |
| H04W 52/28 | (2009.01) | |
| H04L 25/02 | (2006.01) | |

(52) U.S. Cl.
CPC ............. *H04L 5/0048* (2013.01); *H04L 5/026* (2013.01); *H04L 25/0228* (2013.01); *H04L 27/0008* (2013.01); *H04L 27/2607* (2013.01); *H04L 27/2613* (2013.01); *H04L 27/2647* (2013.01); *H04L 27/2655* (2013.01); *H04W 52/286* (2013.01)
USPC ............. 455/70; 370/320; 370/208; 370/210; 370/259; 370/280; 375/141; 375/222; 375/233; 375/260; 375/299; 708/422; 382/100

(56) References Cited

U.S. PATENT DOCUMENTS

| | | | |
|---|---|---|---|
| 5,265,119 A | 11/1993 | Gilhousen et al. | |
| 5,267,261 A | 11/1993 | Blakeney, II et al. | |
| 5,268,938 A | 12/1993 | Feig et al. | |
| 5,559,790 A | 9/1996 | Yano et al. | |
| 5,799,005 A | 8/1998 | Soliman | |
| 5,870,378 A | 2/1999 | Huang et al. | |
| 5,903,554 A | 5/1999 | Saints | |
| 5,914,987 A * | 6/1999 | Fogel | 375/340 |
| 6,011,980 A | 1/2000 | Nagano et al. | |
| 6,038,450 A | 3/2000 | Brink et al. | |
| 6,074,086 A * | 6/2000 | Yonge, III | 708/422 |
| 6,097,972 A | 8/2000 | Saints et al. | |
| 6,175,550 B1 | 1/2001 | Van Nee | |
| 6,219,377 B1 | 4/2001 | Linz | |
| 6,359,933 B1 * | 3/2002 | Aslanis et al. | 375/260 |
| 6,498,806 B1 * | 12/2002 | Davis | 375/222 |
| 6,519,292 B1 | 2/2003 | Sakoda et al. | |
| 6,546,056 B1 * | 4/2003 | Rosenlof | 375/260 |
| 6,563,786 B1 | 5/2003 | Nee | |
| 6,570,912 B1 | 5/2003 | Mirfakhraei | |
| 6,584,144 B2 | 6/2003 | Alamouti et al. | |
| 6,608,864 B1 * | 8/2003 | Strait | 375/233 |
| 6,714,582 B2 * | 3/2004 | Nakamura et al. | 375/141 |
| 7,031,371 B1 | 4/2006 | Lakkis | |
| 7,054,375 B2 | 5/2006 | Kannan et al. | |
| 7,106,781 B2 | 9/2006 | Agee et al. | |
| 7,151,740 B2 | 12/2006 | Zhang et al. | |
| 7,206,349 B2 | 4/2007 | Linnartz et al. | |
| 7,248,841 B2 | 7/2007 | Agee et al. | |
| 7,453,793 B1 * | 11/2008 | Jones et al. | 370/203 |
| 7,764,594 B2 | 7/2010 | Walton et al. | |
| 7,873,021 B2 * | 1/2011 | Petre et al. | 370/342 |
| 8,427,936 B2 | 4/2013 | Walton et al. | |
| 2002/0122465 A1 | 9/2002 | Agee et al. | |
| 2002/0122499 A1 | 9/2002 | Kannan et al. | |
| 2002/0145968 A1 | 10/2002 | Zhang et al. | |
| 2003/0081538 A1 | 5/2003 | Walton et al. | |
| 2003/0081655 A1 * | 5/2003 | Nakamura et al. | 375/141 |
| 2003/0169683 A1 * | 9/2003 | Mendlovic et al. | 370/208 |
| 2004/0001606 A1 * | 1/2004 | Levy | 382/100 |
| 2004/0095907 A1 | 5/2004 | Agee et al. | |
| 2004/0120274 A1 * | 6/2004 | Petre et al. | 370/320 |
| 2004/0131011 A1 * | 7/2004 | Sandell et al. | 370/210 |
| 2005/0195734 A1 * | 9/2005 | Sandell et al. | 370/208 |
| 2007/0183520 A1 * | 8/2007 | Kim et al. | 375/260 |
| 2007/0201569 A1 * | 8/2007 | Pajukoski et al. | 375/260 |
| 2007/0217546 A1 * | 9/2007 | Sandell et al. | 375/299 |
| 2008/0090528 A1 * | 4/2008 | Malladi | 455/70 |
| 2008/0095106 A1 * | 4/2008 | Malladi et al. | 370/329 |
| 2008/0144737 A1 * | 6/2008 | Naguib | 375/299 |
| 2009/0207926 A1 * | 8/2009 | Huang et al. | 375/260 |
| 2010/0074343 A1 * | 3/2010 | Gaal et al. | 375/259 |
| 2010/0085955 A1 * | 4/2010 | Luo et al. | 370/344 |
| 2010/0098012 A1 * | 4/2010 | Bala et al. | 370/329 |
| 2010/0238978 A1 * | 9/2010 | Lele et al. | 375/146 |
| 2010/0246642 A1 | 9/2010 | Walton et al. | |
| 2010/0316040 A1 * | 12/2010 | Kim et al. | 370/343 |
| 2011/0007673 A1 * | 1/2011 | Ahn et al. | 370/280 |
| 2011/0051824 A1 * | 3/2011 | Kim et al. | 375/259 |
| 2011/0317671 A1 * | 12/2011 | Walton et al. | 370/336 |

OTHER PUBLICATIONS

Bingham J.A.C., "Multicarrier modulation for data transmission: An idea whose time has come," Communications Magazine, IEEE, , vol. 28, Issue 5, pp. 5-14 (May 1990).

Chouly, A., et al., "Orthogonal multicarrier techniques applied to direct sequence spread spectrum CDMA systems," in Proceedings of the IEEE GLOBECOM '93, Nov. 1993, pp. 1723-1728, vol. 3.

Giannakis G.B., et al., "AMOUR—Generalized Multicarrier Transceivers for Blind COMA Regardless of Multipath", IEEE Transactions on Communications, vol. 48, No. 12, pp. 2064-2076, Dec. 2000.

Hara S., et al., "Overview of Multicarrier CDMA", IEEE Comm. Mag., Dec. 1997, pp. 126-133.

Yee N., et al., "Multi-Carrier CDMA in an Indoor Wireless Radio Channel," Technical Report Identifier: ERL-94-6, Jan. 1, 1994. pp. 56.

Yee N., et al., "Multi-Carrier CDMA in Indoor Wireless Radio Networks," in Proceedings of PIMRC'93, 1993, pp. 1-8.

International Preliminary Examination Report—PCT/US02/33928, IPEA/US—Alexandaria, Virginia—Jul. 14, 2004.

International Search Report—PCT/US/02/33928, International Search Authority—European Patent Office—Feb. 26, 2003.

Jankiraman, et al., "A novel solution to wireless multimedia application: the hybrid OFDM/CDMA/SFH approach, 2000 PIMRC 2000 The IIth IEEE International Symposium, TS A ,T=f',/"YATC, TTNOD," Personal, Indoor and Mobile Radio Communications, 2000, 2, 1368-1374.

Kalofonos, et al., "On the performance of adaptive MMSE detectors for a MC-CDMA system in fast fading Rayleigh channels," Personal, Indoor and Mobile Radio Communications, The Ninth IEEE International Symposium, 1998, 3, 1309-1313.

Khaled Fazel, Narrow-Band Interference Rejection in Orthogonal Multi-carrier Spread-Spectrum Communications, Oct. 1994, 1994 Third Annual International Conference on Universal Personal Communications, pp. 46-50.

Stirling-Gallacher et al., "Performance of a OFDM-CDMA System with Orthogonal Convolutional Coding and Interference Cancellation," Vehicular Technology Conference, IEEE 47th, Phoenix, Arizona, May 1997, pp. 860-864.

Tomba et ak., "Downlink Detection Schemes for MC-CDMA Systems in Indoor Environments," IEICE Transactions of Communications, vol. E79B, No. 9, Sep. 1996, pp. 1351-1360, XP000636076.

Written Opinion—PCT/US02/033928, IPEA/US, Aug. 20, 2003.

Design and Performance of Multicarrier CDMA System in Frequency-Selective Rayleigh Fading Channels; Shinsuke Hara, *Member, IEEE*, and Ramjee Prasad, *Senior Member, IEEE*; IEEE Transactions on Vehicular Technology, vol. 48, No. 5, Sep. 1999; p. 1584-1595.

* cited by examiner

MULTIPLE-ACCESS HYBRID OFDM-CDMA SYSTEM

CLAIM OF PRIORITY

This application is a continuation of U.S. patent application Ser. No. 10/696,208, entitled "Multiple-Access Hybrid OFDM-CDMA System" and filed Oct. 29, 2003, pending, which is a divisional of U.S. patent application Ser. No. 09/982,280, entitled "Multiple-Access Hybrid OFDM-CDMA System" and filed Oct. 18, 2001, now abandoned, both of which are assigned to the assignee of this application and are fully incorporated herein by reference for all purposes.

BACKGROUND

1. Field

The present disclosure relates generally to data communication, and more specifically to a multiple-access hybrid OFDM-CDMA communication system.

2. Background

Wireless communication systems are widely deployed to provide various types of communication such as voice, data, and so on. These systems may be multiple-access systems capable of supporting communication with multiple users (sequentially or simultaneously) by sharing the available system resources (e.g., bandwidth and transmit power). Such systems may be based on code division multiple access (CDMA), time division multiple access (TDMA), frequency division multiple access (FDMA), some other multiple access technique, or a combination thereof. CDMA systems may provide certain advantages over other types of system, including increased system capacity. CDMA systems may also be designed to implement known CDMA standards such as IS-95, cdma2000, IS-856, W-CDMA, and others.

An orthogonal frequency division modulation (OFDM) system effectively partitions the system bandwidth into a number of (M) sub-bands (or frequency bins or sub-channels). At each time interval that may be dependent on the bandwidth of each sub-band, a modulation symbol may be transmitted on each of the M sub-bands.

In a direct sequence (DS) CDMA system, a narrowband signal is spread over the entire system bandwidth in the time domain with a spreading sequence. Example DS-CDMA systems include those that conform to IS-95, cdma2000, and W-CDMA standards. The spreading sequence may be a pseudo-random noise (PN) sequence (e.g., for IS-95 and cdma2000) or a scrambling sequence (e.g., for W-CDMA). A DS-CDMA system provides certain advantages such as ease of supporting multiple access, narrow-band rejection, and so on.

As the system bandwidth increases to support higher data rates and/or under certain operating conditions, a DS-CDMA system is more susceptible to frequency selective fading (i.e., different amounts of attenuation across the system bandwidth). For such a frequency-selective channel, time dispersion in the channel introduces inter-symbol interference (ISI), which can degrade system performance.

There is therefore a need in the art for a multiple-access CDMA-based system capable of mitigating ISI, supporting flexible operation, and providing improved system performance.

SUMMARY

Techniques for implementing a multiple-access hybrid OFDM-CDMA system that may be used to provide wireless voice and/or data communications are disclosed. The hybrid OFDM-CDMA system combines the benefits of OFDM with those of CDMA to provide numerous advantages.

In one aspect, the data spreading at a transmitter unit (e.g., a base station or a terminal) is performed in the frequency domain instead of the time domain. This may be achieved by spreading each data stream (e.g., for a particular user) with a respective spreading code (selected from a set of available spreading codes) prior to an inverse fast Fourier transform operation to derive OFDM symbols. The frequency domain spreading may be used to combat frequency selective fading and to mitigate inter-symbol interference (ISI) at a receiver unit.

To support multiple access, the available system resources may be allocated and de-allocated to users (e.g., as necessary and if available). For example, spreading codes may be assigned to users as needed, transmit power may be allocated to users, and so on. Various techniques are provided to support variable rate data for each user via a combination of spreading adjustment and transmit power scaling.

Various interference control techniques are provided to improve system performance. For example, power control may be implemented for the downlink (also know as the forward link) and/or uplink (also known as the reverse link) to achieve the desired level of performance while minimizing the amount of interference to other transmissions. A pilot may also be transmitted by each transmitter unit to assist the receiver units perform a number of functions such as acquisition, timing synchronization, carrier recovery, handoff, channel estimation, coherent data demodulation, and so on.

Various aspects and embodiments of the disclosure are described in further detail below. The disclosure further provides methods, receiver units, transmitter units, terminals, base stations, systems, and other apparatus and elements that implement various aspects, embodiments, and features of the disclosure, as described in further detail below.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
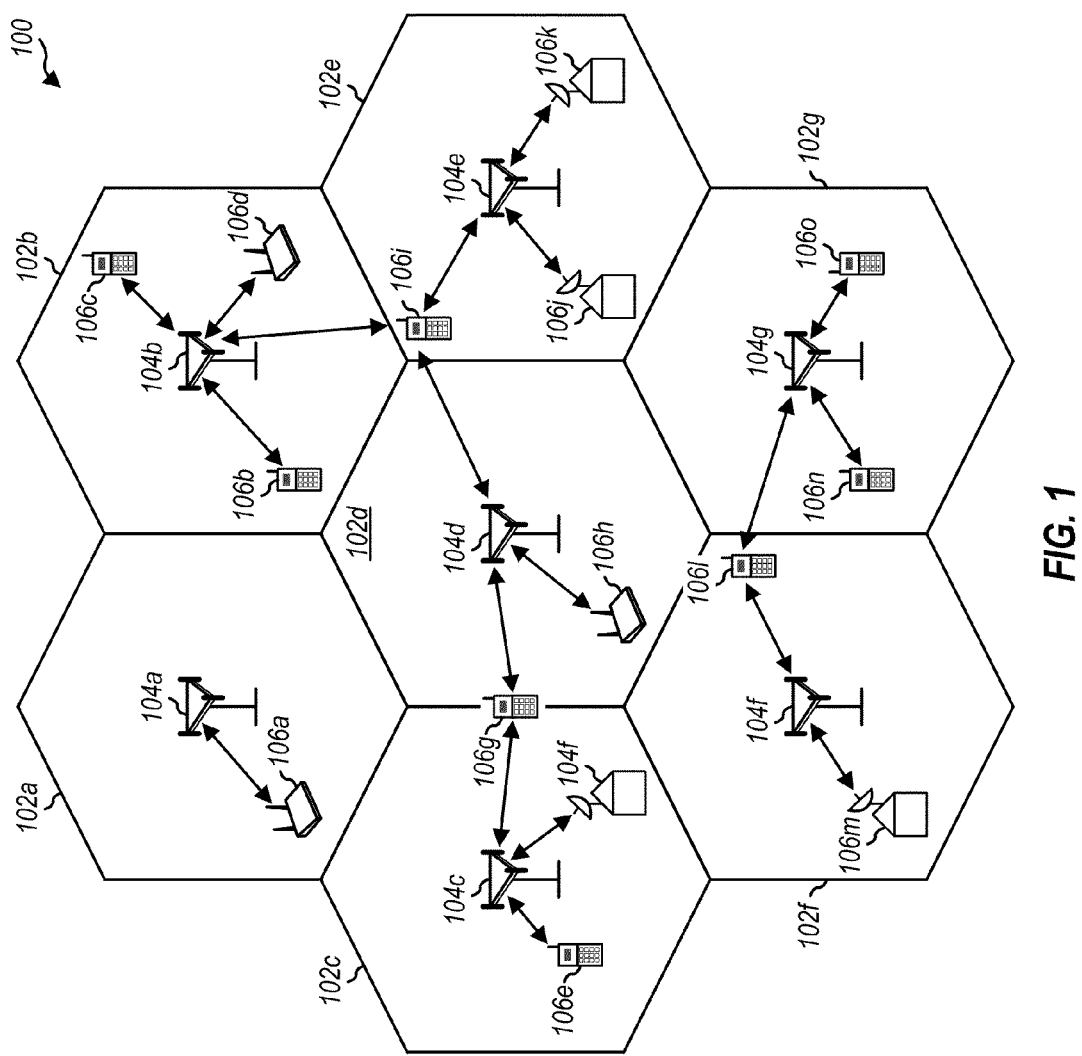
FIG. 1 is a diagram of a multiple-access OFDM-CDMA system capable of implementing various aspects and embodiments of the disclosure.

FIG. 1 is a diagram of a multiple-access OFDM-CDMA system 100 that supports a number of users and is capable of implementing various aspects and embodiments of the disclosure. System 100 provides communication for a number of coverage areas 102a through 102g, each of which is serviced by a corresponding base station 104 (which may also be referred to as an access point, a node B, or some other terminology). The base station and/or its coverage area are also often referred to as a cell. A cell may also be partitioned into multiple (e.g., three) sectors, each of which may be associated with a respective (directional) beam pattern for the downlink. All sectors of the same cell are typically serviced by a single base station. For a given terminal, a "serving" cell/sector is one in active communication with the terminal.

As shown in FIG. 1, various terminals 106 are dispersed throughout the system, and each terminal may be fixed (i.e., stationary) or mobile. Each terminal may communicate with one or possibly more cells/sectors on the downlink and/or uplink at any given moment depending on whether or not it is active, whether or not it is in "soft handoff" or "softer handoff", and so on. Soft handoff refers to concurrent communication with two or more cells to increase reliability, and softer handoff refers to concurrent communication with two or more sectors of the same cell to increase reliability.

The downlink (forward link) refers to transmission from the base station to the terminal, and the uplink (reverse link) refers to transmission from the terminal to the base station. In FIG. 1, base station 104a communicates with terminal 106a, base station 104b communicates with terminals 106b, 106c, 106d, and 106i, base station 104c communicates with terminals 106e, 106f, and 106g, and so on. Terminal 106g is in soft handoff with base stations 104c and 104d, terminal 106i is in soft handoff with base stations 104b, 104d, and 104e, and terminal 106l is in soft handoff with base stations 104f and 104g.

System 100 may also be designed to implement any number of standards and designs for CDMA, TDMA, FDMA, and other multiple access schemes. The CDMA standards include the IS-95, cdma2000, IS-856, W-CDMA, and TS-CDMA standards, and the TDMA standards include the Global System for Mobile Communications (GSM) standard. These standards are known in the art and incorporated herein by reference.

Figure 2:
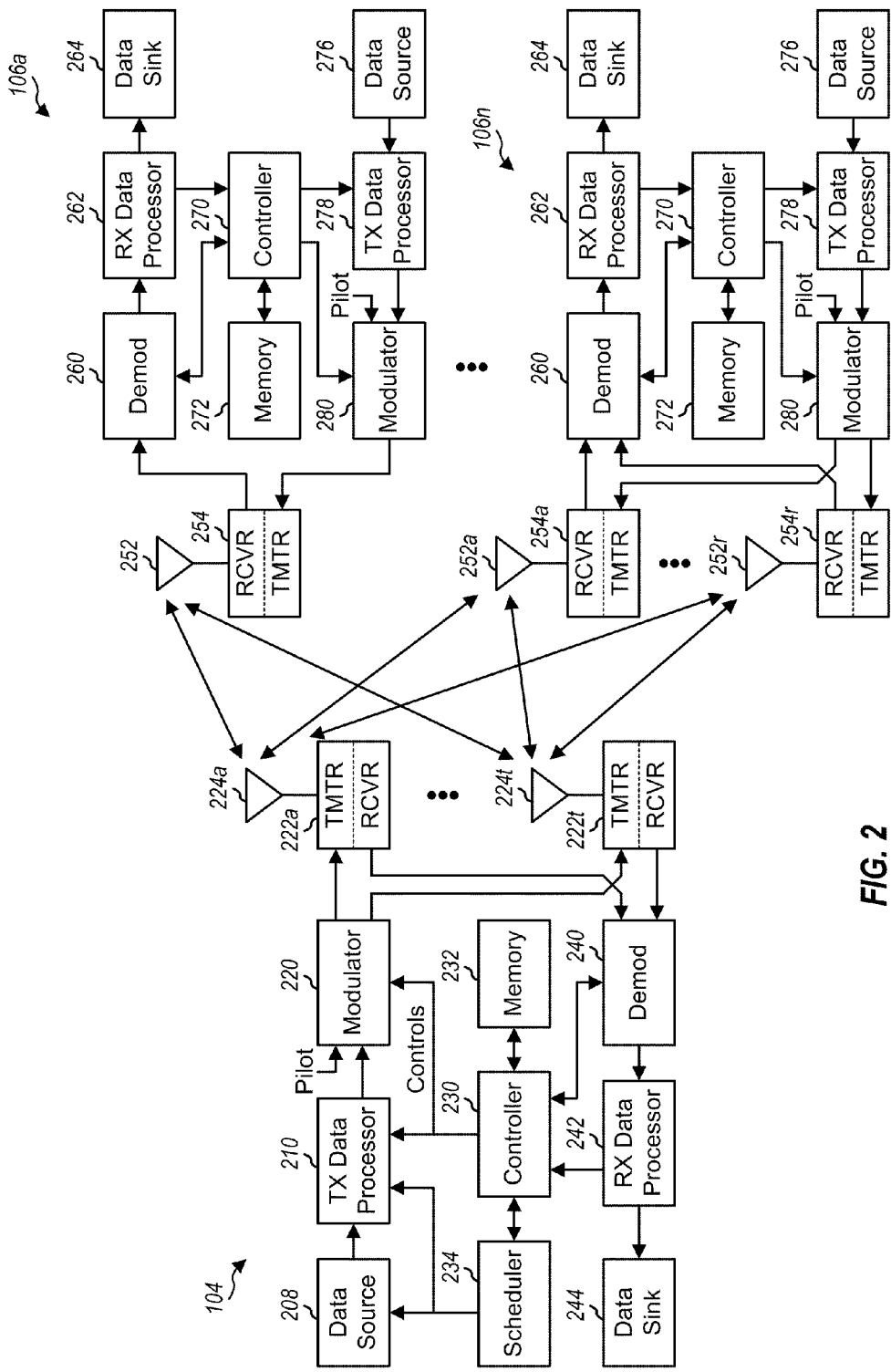
FIG. 2 is a simplified block diagram of an embodiment of a base station and two terminals.

FIG. 2 is a simplified block diagram of an embodiment of base station 104 and two terminals 106, which are capable of implementing various aspects and embodiments of the disclosure. Each terminal 106 may concurrently communicate with multiple base stations 104 when in soft handoff (not shown in FIG. 2 for simplicity).

On the downlink, at base station 104, various types of traffics such as user-specific data from a data source 208, signaling, and so on, are provided to a transmit (TX) data processor 210, which formats, possibly interleaves, and encodes the traffics based on one or more coding schemes to provide coded data. Each coding scheme may include any combination of cyclic redundancy check (CRC), convolutional coding, Turbo coding, block coding, and other coding, or no coding at all. Typically, different types of traffic are coded using different coding schemes. In a specific embodiment, the user data may be partitioned into frames (or packets). For each frame, the data may be used to generate a set of CRC bits, which are appended to the data, and the data and CRC bits may then be interleaved and coded with a convolutional code or a Turbo code to generate the coded data for the frame.

The coded data is then provided to a modulator (MOD) 220 and further processed to generate modulated data. In a specific embodiment, the processing by modulator 220 includes (1) spreading the coded data for each user with a respective set of one or more spreading codes, (2) transforming the spread data, (3) scaling the transformed data for each user with a respective gain, (4) combining the scaled data for all users and other data for other channels (e.g., pilot, sync, and paging channels), and (5) covering the combined data with a cover code. The processing by modulator 220 is described in further detail below.

The modulated data is then provided to one or more transmitters (TMTR) 222, one transmitter for each antenna used to transmit the data. Each transmitter 222 converts the received data into one or more analog signals and further conditions (e.g., amplifies, filters, and quadrature modulates) the analog signals to generate a respective downlink modulated signal suitable for transmission over a wireless link. Each downlink modulated signal is then transmitted via a respective antenna 224 to the terminals.

At each terminal 106, one or more downlink modulated signals from one or more base stations are received by one or more antennas 252. The received signal from each antenna 252 is provided to a respective receiver (RCVR) 254, which conditions (e.g., filters, amplifies, and downconverts) the received signal and digitizes the conditioned signal to provide a respective stream of data samples. A demodulator (Demod) 260 then receives and processes the streams of data samples from all receivers 254 to provide demodulated symbols (i.e., demodulated data). In a specific embodiment, the processing by demodulator 260 includes (1) uncovering the received data samples with the cover code associated with the cell/sector being demodulated, (2) transforming the uncovered data samples, (3) despreading the transformed samples, and (4) combining the despread samples derived from multiple receive antennas (if available). The processing by demodulator 260 is described in further detail below.

A receive (RX) data processor 262 then decodes the demodulated symbols to recover the user-specific data transmitted on the downlink. The processing by demodulator 260 and RX data processor 262 is complementary to that performed by modulator 220 and TX data processor 210, respectively, at base station 104.

On the uplink, at terminal 106, various types of traffics such as user-specific data from a data source 276, signaling, and so on, are provided to a TX data processor 278, which processes the different types of traffics in accordance with their respective coding schemes to provide coded data. The coded data is further processed (e.g., spread) by a modulator 280 to provide modulated data, which is provided to one or more transmitters 254. Each transmitter 254 conditions the modulated data to generate a respective uplink modulated signal, which is then transmitted via an associated antenna 252 to the base stations.

At each base station 104, the uplink modulated signals from one or more terminals are received by antennas 224. The received signal from each antenna 224 is provided to a receiver 222, which conditions and digitizes the received signal to provide a respective stream of data samples. The data samples are then processed (e.g., despread) by a demodulator 240 and decoded (if necessary) by an RX data processor 242 to recover the data transmitted by the terminals.

Controllers 230 and 270 direct the operation at the base station and the terminal, respectively.

Downlink Modulator and Demodulator

Figure 3:
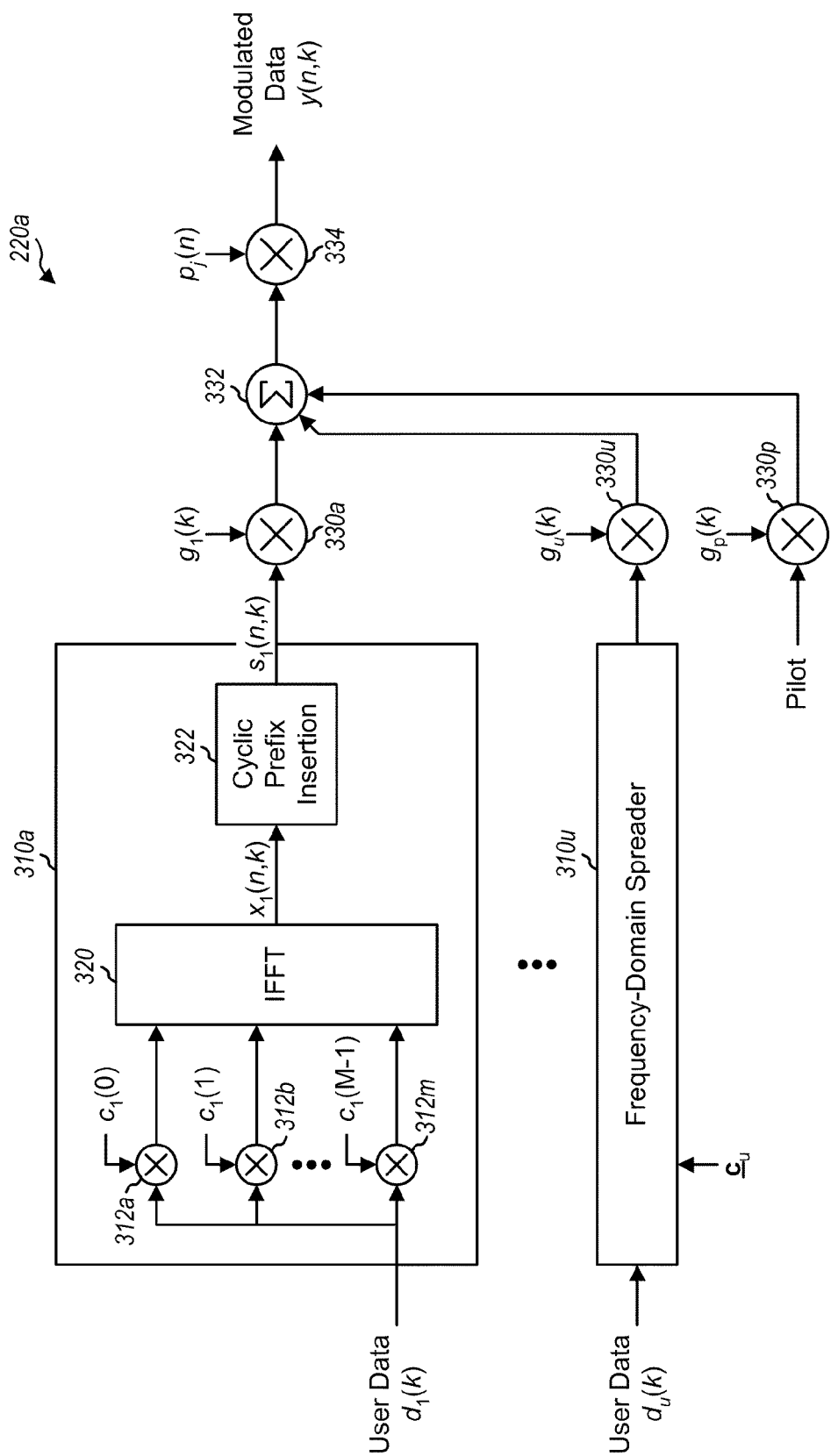
FIG. 3 is a block diagram of an embodiment of a modulator that may be used for the downlink.

FIG. 3 is a block diagram of an embodiment of a modulator 220a that may be used for the downlink, and is one embodiment of modulator 220 in FIG. 2. Modulator 220a receives from TX data processor 210 one or more data streams for one or more users. Each user data stream, $d_u(k)$, is provided by to a respective frequency-domain spreader 310.

In an embodiment, the user data comprises a stream of coded bits. Each coded bit may have a binary value of either zero ("0") or one ("1"), which may then be mapped to a value of −1 or +1, respectively, for the spreading. In another embodiment, the user data comprises a stream of modulation symbols. For this embodiment, a symbol mapping element receives the coded data for the user, groups each set of NB coded bits to form a non-binary symbol, and then maps each non-binary symbol to a point in a signal constellation corresponding to a particular modulation scheme (e.g., QPSK, M-PSK, M-QAM, or some other scheme) selected for the user. Each mapped signal point corresponds to a modulation symbol, and the symbol mapping element would provide a stream of modulation symbols. The user data thus comprises a stream of data symbols, where each data symbol may be a coded bit or a modulation symbol.

Each frequency-domain spreader 310 also receives a set of one or more spreading codes for the received data stream. For simplicity, the following description assumes one data stream for each user and one spreading code for each spreader 310. The spreading code for user u is a sequence of M symbols and may be represented as:

$$\underline{c}_u = \{c_u(0), c_u(1), \ldots, c_u(M-1)\},$$

where each symbol $c_u(m)$ of the spreading code may be a real or a complex value. The spreading code length M represents the spreading ratio for the user data. The spreading codes may be orthogonal codes (e.g., the Walsh codes used in IS-95 and cdma2000) or the orthogonal variable spreading factor (OVSF) codes used in W-CDMA. The spreading codes may also be codes with pseudo-orthogonal properties (e.g., the QOF codes in cdma2000), pseudo-random noise (PN) sequences at different chip offsets, or non-orthogonal codes. In a specific embodiment, the spreading codes used for the downlink are Walsh codes of length M, and each chip of a Walsh sequence corresponds to one symbol of the spreading code.

Within each frequency-domain spreader 310, the user data is provided to a set of M (complex) multipliers 312a through 312m. Each multiplier 312 also receives a respective symbol $c_u(m)$ of the spreading code $\underline{c}_u$ assigned to user u. At each time interval k, a data symbol for user u, $d_u(k)$, is provided to all M multipliers 312. Each multiplier 312 multiplies the received data symbol, $d_u(k)$, with the spreading code symbol, $c_u(m)$, and provides a respective spread symbol to an inverse fast Fourier transformer (IFFT) 320. For each time interval k, IFFT 320 receives M spread symbols from all M multipliers 312, performs an inverse fast Fourier transform on the received symbols, and provides a sequence of $N_{IFFT}$ transformed samples, $x_u(n,k)$, that collectively comprise an OFDM symbol for the data symbol, $d_u(k)$. The transformed samples, $x_u(n,k)$, may be expressed as:

$$x_u(n,k) = \frac{1}{M} \sum_{m=0}^{M-1} d_u(k) \cdot c_u(m) \cdot e^{-(j2\pi)\frac{mn}{N_{IFFT}}}, \quad \text{Eq. (1)}$$

for $n = 0, 1, \ldots, N_{IFFT} - 1$, where $N_{IFFT}$ is the dimension of the IFFT and also represents the number of sub-bands (or frequency bins or sub-channels) for the OFDM scheme. Other transformations may also be used and are within the scope of the disclosure. For example, wavelet or some other ortho-normal functions may be used for other OFDM-like schemes.

OFDM is described in further detail in a paper entitled "Multicarrier Modulation for Data Transmission: An Idea Whose Time Has Come," by John A. C. Bingham, IEEE Communications Magazine, May 1990, which is incorporated herein by reference.

In general, the length of the spreading code $\underline{c}_u$ is selected to be equal to or less than the dimension of the IFFT (i.e., $M \leq N_{IFFT}$). When the spreading code length is less than the IFFT dimension (i.e., $M < N_{IFFT}$), the ($N_{IFFT}-M$) "left-over" sub-bands may be used for other functions such as, for example, guard-band tones, pilot, overhead channel(s), power control, signaling, and so on. In a specific embodiment, the spreading code length is selected to be equal to the IFFT dimension (i.e., $M = N_{IFFT}$).

The OFDM symbols, $x_u(n,k)$, from IFFT 320 are provided to a cyclic prefix insertion unit 322, which appended a cyclic prefix to each OFDM symbol to form a corresponding transmission symbol, $s_u(n,k)$. In particular, the cyclic prefix insertion may be performed by duplicating the first L transformed samples of the OFDM symbol and appending these samples at the end of the OFDM symbol. The transmission symbol, $s_u(n,k)$, may thus be expressed as:

$$s_u(n,k) = \begin{cases} x_u(n,k) & \text{for } n = 0, 1, \ldots, N_{IFFT} - 1 \\ x_u(n - N_{IFFT}, k) & \text{for } n = N_{IFFT}, \ldots, N_{IFFT} + L - 1. \end{cases} \quad \text{Eq. (2)}$$

The cyclic prefix may be used to preserve orthogonality among the $N_{IFFT}$ sub-channels in the presence of time dispersion in the communication channel. In this case, the duration of the cyclic prefix, L, is selected to be greater than or equal to the maximum delay spread of the communication channel.

The transmission symbols, $s_u(n,k)$, for each user are then provided to a respective multiplier 330, which also receives a gain variable, $g_u(k)$, associated with the user. The gain variable, $g_u(k)$, is representative of the total gain for the user and may be expressed as:

$$g_u(k) = g_u^{pc}(k) \cdot g_u^{rate}(k) \quad \text{Eq. (3)}$$

where $g_u^{pc}(k)$ is a gain variable used to adjust the downlink transmit power for user u at time interval k, and is used for downlink power control; and $g_u^{rate}(k)$ is a gain variable used to control the downlink transmit power for user u at time k, and is used to account for variable rate data.

The rate control gain variable, $g_u^{rate}(k)$, may be used to accommodate the variable nature of a data source (e.g., a vocoder) for the user data. The rate control gain is typically proportional to the ratio of the data rate, $r_u(k)$, at time interval k to the maximum data rate, $r_{max}$, associated with a particular code channel (i.e., $g_u^{rate}(k) \propto r_u(k)/r_{max}$). The rate control gain variable may thus be used to perform the power scaling function for variable rate data, as described below. The gain variable, $g_u(k)$, may also incorporate other gain variables used for other functions, and this is within the scope of the disclosure.

Each multiplier 330 scales the received transmission symbols, $s_u(n,k)$, with the gain variable, $g_u(k)$, and provides scaled transmission symbols to a summer 332. For each time interval k, summer 332 receives and combines the scaled transmission symbols from all enabled multipliers 330 and other data for other overhead channels (e.g., pilot, broadcast, paging, sync, and power control channels) to provide combined data. For example, the scaled pilot is provided by a multiplier 330p and combined with the other data by summer 332. A multiplier 334 then receives and multiplies the combined data with a cover code, $p_j(n)$, to provide modulated data, y(n,k) Multiplier 334 effectively covers the combined data with the cover code assigned to the cell/sector.

In an embodiment, the cover code, $p_j(n)$, is unique to the j-th cell or sector serviced by the base station, and allows the terminals to identify the individual cells/sectors. The cover code may be a PN sequence (e.g., the short PN sequences of length 32,768 used in IS-95 and cdma2000), a scrambling sequence (e.g., the scrambling codes used in W-CDMA), or some other sequences. In general, an objective of a good cover code is to render the signals despread from another base station white (i.e., low correlation).

As shown in FIG. 3, a pilot is transmitted along with the user data and other overhead data. The pilot is typically generated based on a known data pattern (e.g., a sequence of all zeros) and processed in a known manner. This then allows the terminals to more easily recover the transmitted pilot. The recovered pilot may then be used at the terminals for various functions such as acquisition, timing synchronization, carrier recovery, handoff, channel estimation, coherent data demodulation, and so on. Various schemes may be used to transmit the pilot and are described in further detail below.

Figure 4:
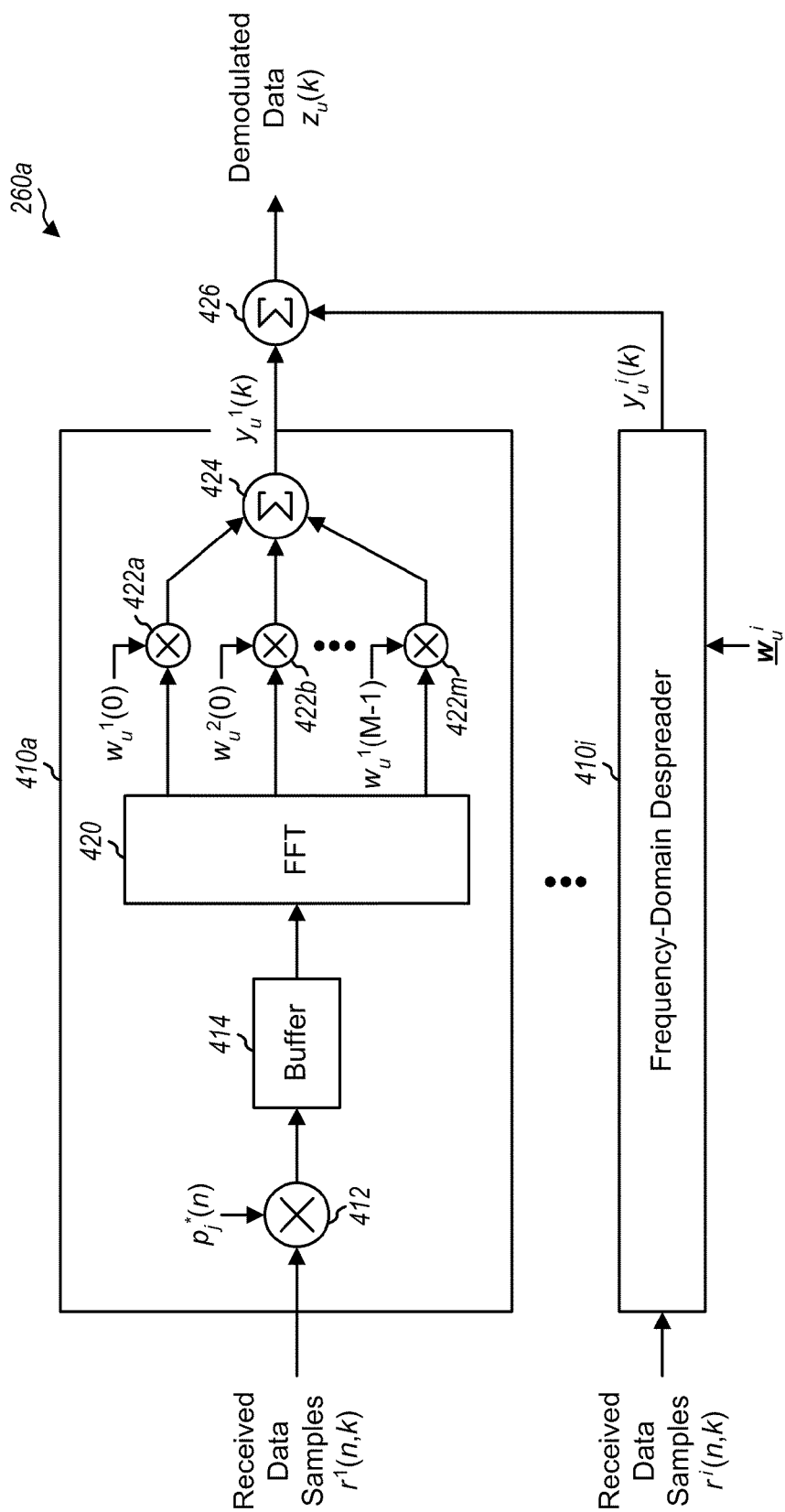
FIG. 4 is a block diagram of an embodiment of a demodulator that may be used for the downlink.

FIG. 4 is a block diagram of an embodiment of a demodulator 260a that may be used for the downlink and is one embodiment of demodulator 260 in FIG. 2. As shown in FIG. 2, each terminal in the system may be equipped with one or multiple receive antennas, and each antenna provides a respective received signal that is conditioned and digitized by an associated receiver 254 to provide a respective stream of (complex) data samples.

In an embodiment, a frequency control loop is used to acquire and track the carrier frequency of each received signal. The frequency acquisition and tracking may be performed in the analog domain by adjusting the frequency of a local oscillator (LO) signal used to downconvert the received signal from radio frequency (RF) to baseband. Alternatively, the frequency acquisition and tracking may be performed in the digital domain by adjusting the frequency of a locally generated sinusoidal signal used to digitally rotate (and thus frequency translate) the data samples. The frequency translation in the digital domain may be performed by a digital rotator (i.e., a complex multiplier). The frequency control loop attempts to remove frequency error in the downconversion of the received signal from RF to baseband, including any frequency offset due to Doppler frequency shift resulting from movement by a mobile terminal. For simplicity, the complex data samples provided by receivers 254 are assumed to have a mean Doppler frequency error of 0 Hz.

In an embodiment, a time control loop is used to acquire and track the timing of each received signal so that data samples are provided with the proper chip timing. Time acquisition and tracking may be performed by adjusting the phase of a clock signal used to digitize the received signal. Alternatively, the time acquisition and tracking may be performed by resampling the received data samples. For simplicity, the complex data samples provided by receivers 254 are assumed to have the proper chip timing.

The frequency and time control loops may be implemented in various manners, as is known in the art and not described herein. The receivers may further derive OFDM symbol timing (e.g., based on the recovered pilot or some other mechanism) and provide the necessary timing signals to demodulator 260a.

Within demodulator 260a, a stream of data samples from each receive antenna is provided to a respective frequency-domain despreader 410. Within each despreader 410, a multiplier 412 uncovers (i.e., multiplies) the received data samples with the (complex-conjugate) cover code, $p_j^*(n)$, associated with the cell/sector being demodulated. The uncovered data samples are then provided to a buffer 414.

For each time interval k, buffer 414 receives $N_{IFFT}+L$ uncovered samples corresponding to a transmission symbol and provides $N_{IFFT}$ samples corresponding to a complete OFDM symbol. A fast Fourier transformer (FFT) 420 receives the $N_{IFFT}$ uncovered samples from buffer 414, performs an $N_{FFT}$-point fast Fourier transform on the received samples, and provides $N_{FFT}$ transformed samples. The dimension of the Fourier transform is typically equal to the dimension of the inverse Fourier transform (i.e., $N_{FFT}=N_{IFFT}$) used at the transmitter unit, and is larger or equal to the size of the OFDM symbol (i.e., $N_{FFT} \geq M$). In an embodiment, $M=N_{FFT}$.

The time control loop provides the necessary OFDM symbol timing for the processing at the receiver unit. Synchronization for the OFDM symbols may be derived, for example, based on the pilot. The symbol timing provided by the time control loop may be used to select the samples for each FFT window. If a cyclic prefix is used, the L additional samples allow for some flexibility in the alignment the FFT window within the OFDM symbol duration.

The transformed samples from FFT 420 for M sub-bands assigned to user u are provided to a set of M (complex) multipliers 422a through 422m. Each multiplier 422 also receives a respective coefficient, $w_u(m)$, in a sequence of despreading coefficients derived for the receive antenna for user u. For coherent detection, the despreading coefficient for each sub-band may be expressed as:

$$w_u(m)=[\hat{h}(m) \cdot c_u(m)]^*, \text{for } m=0,1,\ldots,M-1, \qquad \text{Eq. (4)}$$

where $\hat{h}(m)$ is an estimate of the complex channel gain for the m-th sub-band. The channel response, h(m), may be estimated based on the pilot or the demodulated data, or based on some other techniques. The despreading coefficients shown in equation (4) represent one possible detection strategy. Other detection strategies that may provide improved performance for a frequency selective fading channel may also be used.

In an OFDM-CDMA system, loss of orthogonality occurs at the receiver unit whenever the channel is frequency selective (i.e., different amounts of attenuation for different sub-bands). In this case, in the frequency domain, the spreading codes are subjected to variable attenuation across different symbols of the codes (e.g., different attenuation for different chips of the Walsh sequences). This then destroys the relative orthogonality among the spreading codes and results in residual interference after the despreading/correlation operation at the receiver unit.

The receiver unit may attempt to restore orthogonality among the spreading codes by "inverting" the channel prior to the despreading. The channel inversion is performed per sub-band and typically precedes the despreading, which includes integration to reduce the bandwidth. The channel inversion operation (which is also referred to as a zero forcing operation) requires knowledge of the channel response, h(m), or its estimate, $\hat{h}(m)$. To achieve the channel inversion, the despreading coefficient for each sub-band may be expressed as:

$$w_u(m) = \frac{[\hat{h}(m) \cdot c_u(m)]^*}{|\hat{h}(m)|^2}, \text{ for } m = 0, 1, \ldots, M-1. \quad \text{Eq. (5)}$$

The performance of a demodulator based on the despreading coefficients shown in equation (5) may be poor for some operating scenarios. For example, in the sub-bands where the signal-to-noise-plus-interference ratio (SNR) is low, the weights $\hat{h}(m)/|\hat{h}(m)|^2$ tend to enhance the noise and interference. For improved performance, a minimum mean square error (MMSE) based despreader may be employed where the despreading coefficients may be expressed as:

$$w_u(m) = \frac{[\hat{h}(m) \cdot c_u(m)]^*}{N_0 + |\hat{h}(m)|^2}, \text{ for } m = 0, 1, \ldots, M-1, \quad \text{Eq. (6)}$$

where $N_0$ is the thermal noise power.

Each multiplier 422 multiplies the received transformed samples with the received despreading coefficient to provide a despread sample. For each time interval k, a summer 424 receives and sums the despread samples from all M multipliers 422 to provide a recovered symbol, $y_u(k)$.

If multiple receive antennas and demodulation paths are available at the terminal (e.g., terminal 106n in FIG. 2), then the data sample stream for each antenna may be processed as described above to provide a respective stream of recovered symbols for that diversity branch. If multiple serving cells/sectors are transmitting to the terminal (e.g., for soft/softer handoff), then the received data samples are initially uncovered with the cover codes associated with these cells/sectors. The set of despreading coefficients for each diversity branch is also derived based on the channel response estimated for the user and for that diversity branch. The streams of recovered symbols from all available diversity branches are then provided to a summer 426. For each time interval k, summer 426 (soft) combines the recovered symbols from all diversity branches to provide a corresponding demodulated symbol, $z_u(k)$. The demodulated symbols (i.e., the demodulated data) for user u are then provided to RX data processor 262.

For an OFDM-CDMA system, it is not a requirement to use a cyclic prefix. When a cyclic prefix is used, the delay spread in the received signal is accounted for by the repeated portion of the OFDM symbol, and a rake receiver implementation is not required at the receiver unit. This may simplify the receiver design. However, when a cyclic prefix is not used, a (frequency-domain) rake receiver may be used to perform the despreading/correlation operation at the delays corresponding to the impulse response of the communication channel. For this frequency-domain rake receiver, a number of (M) received data samples corresponding to the OFDM symbol duration and a number of (L) received data samples corresponding to the maximum expected delay spread for the communication channel may be stored for each OFDM symbol. $N_{IFFT}$ samples may then be retrieved from among the $N_{IFFT}+L$ stored samples and processed as described above. The specific samples to be retrieved are determined by the timing associated with the received signal (i.e., the arrival time of the transmitted signal at the receiver unit).

Uplink Modulator and Demodulator

Figure 5:
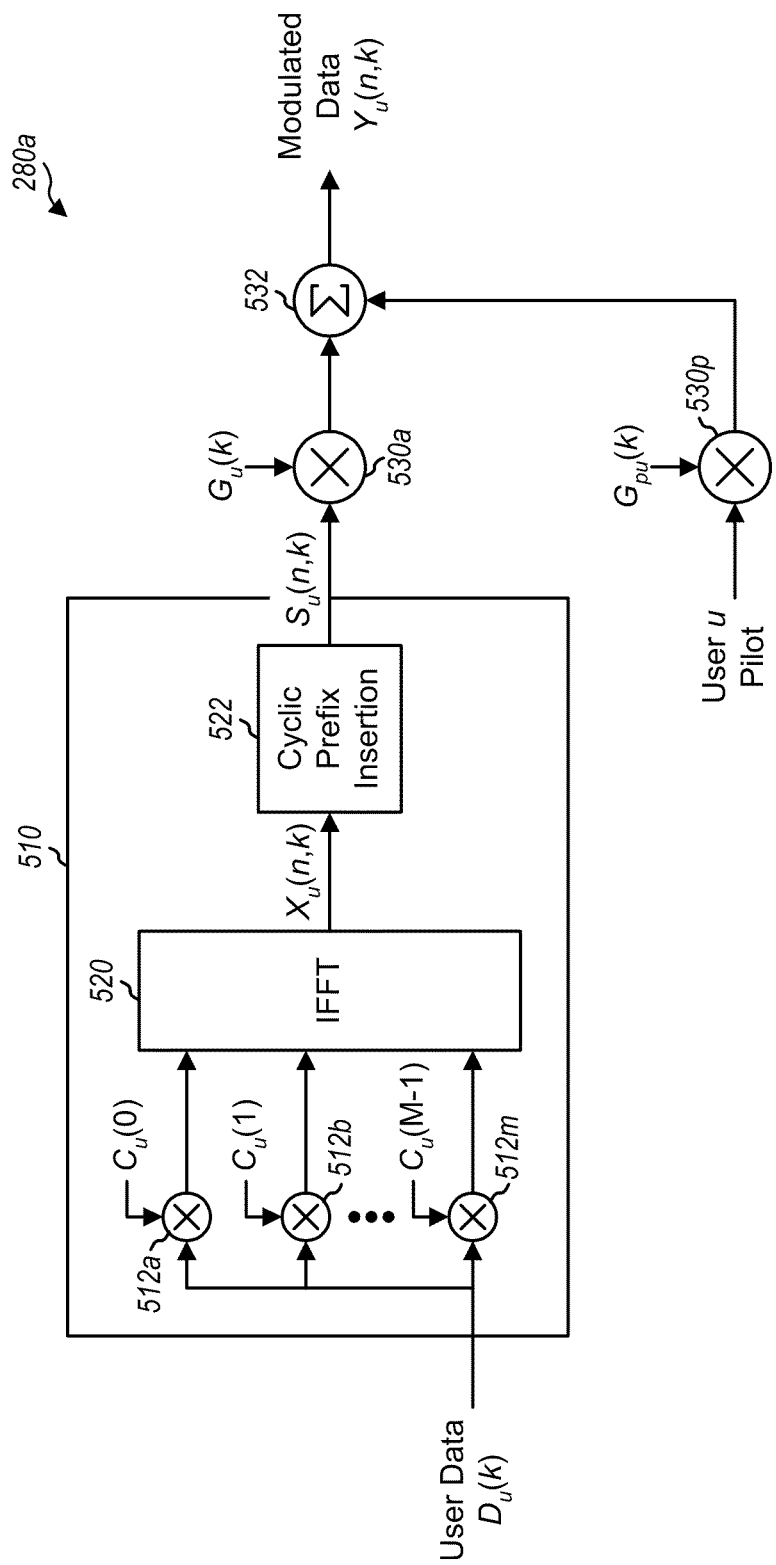
FIG. 5 is a block diagram of an embodiment of a modulator that may be used for the uplink.

FIG. 5 is a block diagram of an embodiment of a modulator 280a that may be used for the uplink, and is one embodiment of modulator 280 in FIG. 2. Modulator 280a receives from TX data processor 278 user data to be transmitted to one or more serving cells/sectors. This user data comprises a stream of data symbols, each of which may be a coded bit or a modulation symbol, as described above.

Within modulator 280a, the user data stream is provided to a frequency-domain spreader 510, which also receives a spreading code associated with the user. The uplink spreading code for user u comprises a sequence of M samples and may be represented as:

$$\underline{C}_u = \{C_u(0), C_u(1), \ldots, C_u(M-1)\}.$$

Again, various types of codes may be used for the uplink spreading codes.

In an embodiment, the spreading code used for the uplink for user u is unique to that user but is not necessarily orthogonal to the spreading codes used by the other users. In particular, as long as the spreading codes are uncorrelated with each other, then processing gain may be obtained relative to the other users and high performance may be realized. Moreover, the uplink spreading codes may be different than the ones used for the downlink. In a specific embodiment, the spreading codes used for the uplink are also Walsh codes of length M.

In cases where the uplink spreading codes are mutually orthogonal, multipath and/or different propagation delays destroy the orthogonality property of the received signals at the receiver unit (i.e., the base station for the uplink). One technique for maintaining orthogonality in the presence of multipath is to assign different sub-bands to different users. When the user data is transmitted over only a fraction of the total uplink bandwidth, the full processing gain is not realized on a per OFDM symbol basis and the frequency diversity of a wideband system is not fully realized.

For simplicity, upper case notations are used for the uplink and correspond to the lower case notations used for the downlink (e.g., $\underline{C}_u$ and $\underline{c}_u$ respectively represent the uplink and downlink spreading codes).

Within spreader 510, the user data is provided to a set of M (complex) multipliers 512a through 512m. Each multiplier 512 also receives a respective symbol $C_u(m)$ of the spreading code assigned to user u. At each time interval k, each multiplier 512 multiplies the received data symbol, $D_u(k)$, with the spreading code symbol, $C_u(m)$, and provides a respective spread symbol to an IFFT 520. For each time interval k, IFFT 520 receives M spread symbols from all M multipliers 512, performs an inverse fast Fourier transform on the received symbols, and provides a sequence of $N_{IFFT}$ transformed samples, $X_u(n,k)$, that collectively comprise an OFDM symbol for the data symbol, $D_u(k)$.

The OFDM symbols, $X_u(n,k)$, from IFFT 520 are then provided to a cyclic prefix insertion unit 522, which appends a cyclic prefix to each OFDM symbol to form a corresponding transmission symbol, $S_u(n,k)$. The transmission symbols are then scaled by a gain variable, $G_u(k)$, by a multiplier 530a. The gain variable, $G_u(k)$, is representative of the total uplink gain for the user, and includes the power control gain, $G_u^{pc}(k)$, the rate control gain, $G_u^{rate}(k)$, and so on. A summer 532 receives and combines the scaled transmission symbols from multiplier 530a and other data for other overhead (e.g., pilot) channels to provide the modulated data, Y(n,k). As shown in FIG. 5, the uplink pilot for user u is scaled by a pilot gain variable, $G_{pu}(k)$, by a multiplier 530p and combined with the scaled transmission symbols. Although not shown in FIG. 5, the combined data from summer 532 may also be covered with a cover code that may be unique to the user or may be common to all users.

Figure 6:
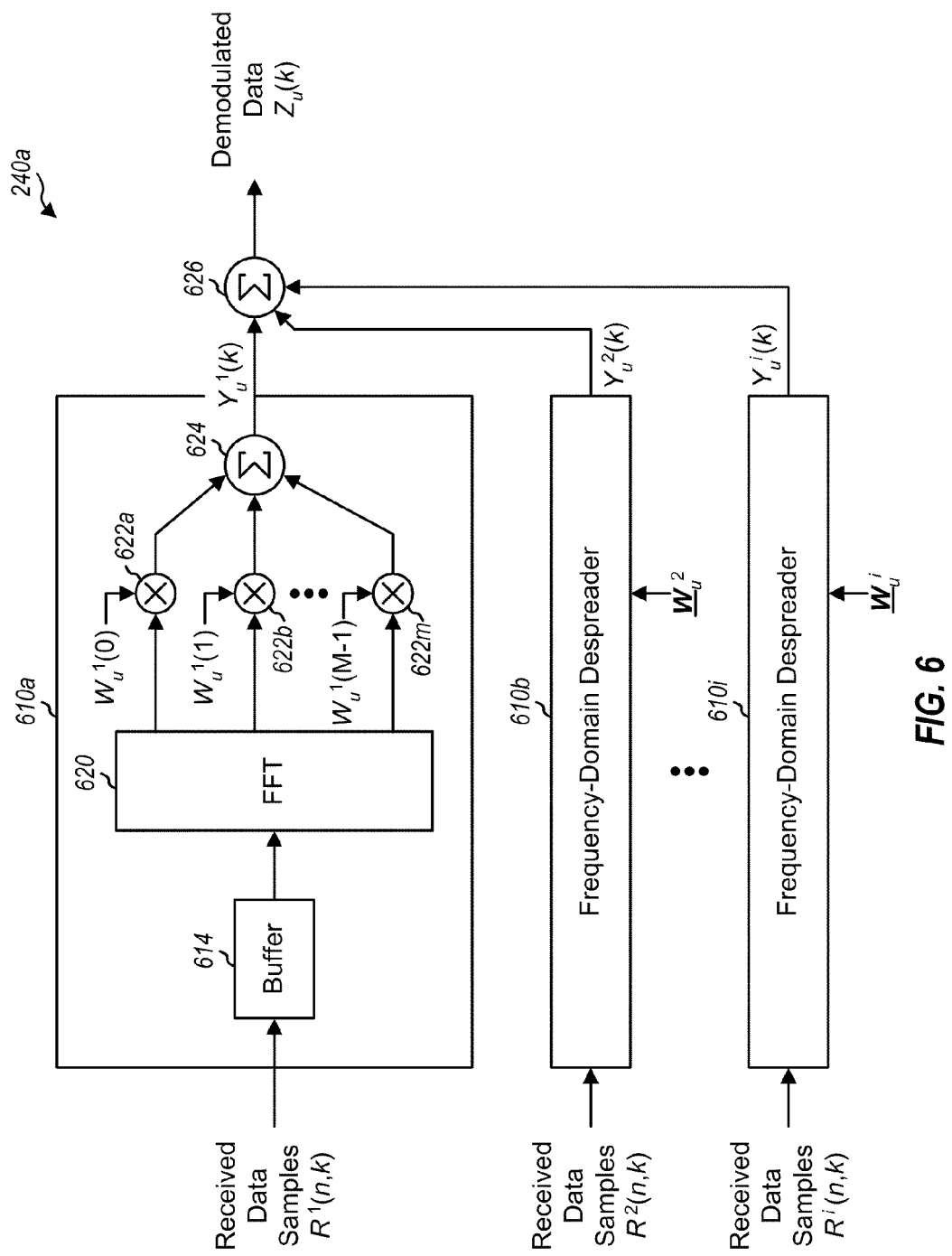
FIG. 6 is a block diagram of an embodiment of a demodulator that may be used for the uplink.

FIG. 6 is a block diagram of an embodiment of a demodulator 240a that may be used for the uplink and is one embodiment of demodulator 240 in FIG. 2. A number of antennas 224 may be used to receive the uplink modulated signals from one or more terminals, and each antenna provides a respective received signal to an associated receiver 222. Each receiver 222 conditions and digitizes the received signal to provide a respective stream of complex data samples, $R^i(k)$.

Within demodulator 240a, each received data sample stream is provided to a respective frequency-domain despreader 610. Within each despreader 610, a buffer 614 receives $N_{IFFT}+L$ samples for each time interval k (if cyclic prefix is used), and provides $N_{IFFT}$ samples corresponding to a complete OFDM symbol. An FFT 620 receives the $N_{IFFT}$ samples from buffer 614, performs an $N_{FFT}$-point fast Fourier transform on the received samples, and provides $N_{FFT}$ transformed samples. For simplicity, the OFDM symbol length is selected to be equal to the FFT dimension (i.e., $N_{IFFT}=N_{FFT}$), although this is not a required condition as described above.

The transformed samples from FFT 620 for M sub-bands used by user u are provided to a set of M (complex) multipliers 622a through 622m. Each multiplier 622 also receives a respective coefficient, $W_u^i(m)$, in a sequence of despreading coefficients derived for the i-th receive antenna for user u. For coherent detection, the despreading coefficient for each sub-band may be expressed as:

$$W_u^i(m) \propto [\hat{h}_u^i(m) \cdot C_u(m)]^*, \text{for } m=0,1,\ldots,M-1, \quad \text{Eq. (7)}$$

where $\hat{h}_u^i(m)$ is an estimate of the complex channel gain for user u for the m-th sub-band on the i-th diversity branch. Similar to the downlink, the despreading coefficients may be derived as:

$$W_u^i(m) = \frac{[\hat{h}_u^i(m) \cdot C_u(m)]^*}{|\hat{h}_u^i(m)|^2}, \text{ for } m=0,1,\ldots,M-1, \quad \text{Eq. (8)}$$

or as:

$$W_u^i(m) = \frac{[\hat{h}_u^i(m) \cdot C_u(m)]^*}{N_O + |\hat{h}_u^i(m)|^2}, \text{ for } m=0,1,\ldots,M-1, \quad \text{Eq. (9)}$$

As shown in equations (7) through (9), the despreading coefficients are a function of the user's spreading code, $C_u(m)$, and the channel response estimates, $\hat{h}_u^i(m)$, associated with each diversity branch used for the user.

Each multiplier 622 multiplies the received transformed sample with the received despreading coefficient to provide a scaled sample. For each time interval k, summer 624 receives and sums the scaled samples from all M multipliers 622 to provide a recovered symbol, $Y_u^i(k)$, for user u for the i-th diversity branch.

If multiple diversity branches are used for user u, then the recovered symbols, $Y_u^i(k)$, from all diversity branches for user u are provided to a summer 626. For each time interval k, summer 626 combines all recovered symbols for user u to provide a demodulated symbol, $Z_u(k)$, which is then provided to RX data processor 242. The diversity combining may be performed, for example, for a terminal in softer handoff with multiple sectors of the same cell, since these sectors are typically serviced by a single base station.

Power Control

A power control mechanism may be implemented for each of the downlink and uplink to reduce interference and improve system throughput. The power control mechanisms for the downlink and uplink may be implemented in various manners, and different mechanisms may also be used for the downlink and uplink. A specific power control mechanism is described below, but other mechanisms may also be used and are within the scope of the disclosure.

Figure 7:
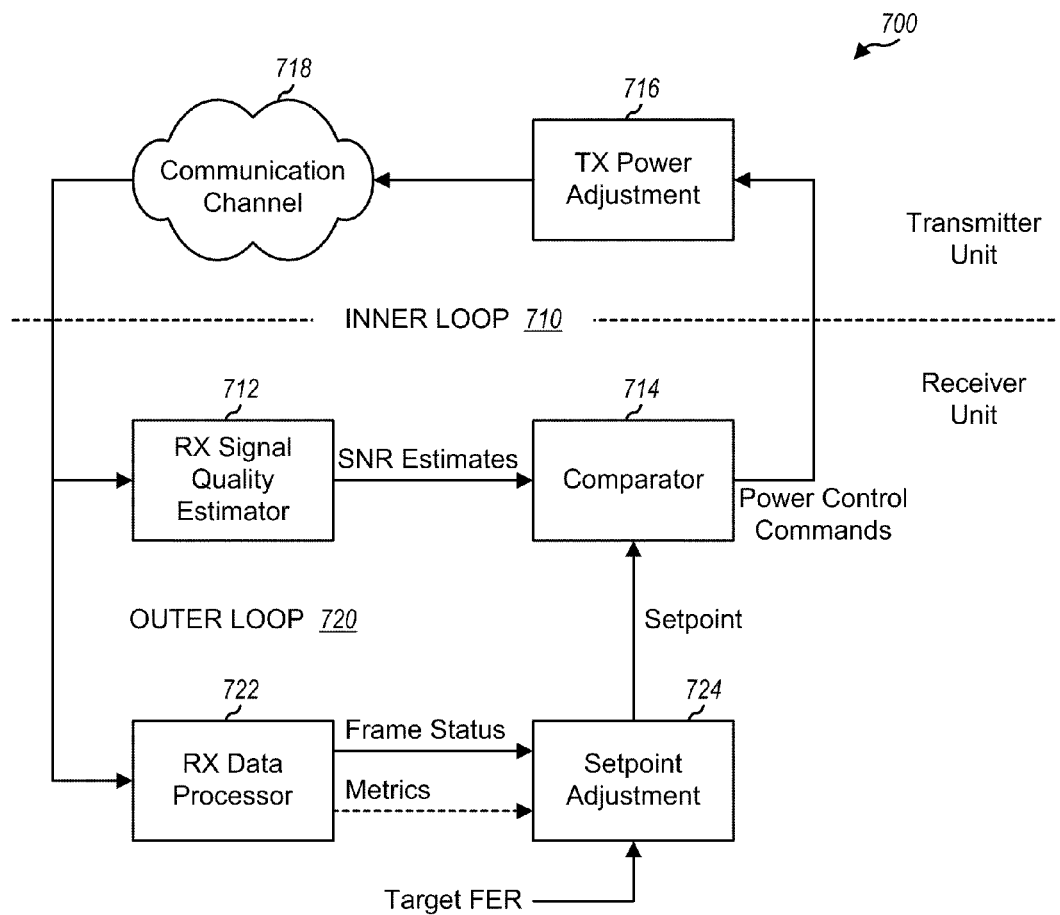
FIG. 7 is a diagram of a power control mechanism that may be used to control the transmit power of a downlink or uplink transmission.

FIG. 7 is a diagram of a power control mechanism 700 that includes an inner loop power control 710 operating in conjunction with an outer loop power control 720. As shown in FIG. 7, inner loop 710 operates between the transmitter and receiver units, and outer loop 720 operates at the receiver unit.

Inner loop 710 is a (relatively) fast loop that attempts to maintain the signal quality of a transmission, as received at the receiver unit, as close as possible to a target SNR, which is often referred to as the SNR setpoint (or simply, the setpoint). One inner loop may be maintained for each data stream to be independently power controlled.

The inner loop power adjustment for a particular data stream is typically achieved by (1) estimating the signal quality of the data stream as received at the receiver unit (block 712), (2) comparing the received signal quality estimate against the setpoint (block 714), and (3) sending power control information back to the transmitter unit. The received signal quality may be estimated based on the data stream to be power controlled, a pilot associated with the data stream, or some other transmission having an established relationship with the data stream to be power controlled. In an embodiment, the power control information is in the form of an "UP" command to request an increase in the transmit power or a "DOWN" command to request a decrease in the transmit power. Each UP and DOWN command may correspond to a change in transmit power of, e.g., +0.5 dB and −0.5 dB, respectively. The transmitter unit may adjust the transmit power for the data stream accordingly (block 716) each time it receives a power control command. A power control command may be sent for each OFDM symbol or each frame, or for some other unit of time.

Due to path loss in the communication channel (cloud 718) that typically varies over time, especially for a mobile terminal, the received signal quality at the receiver unit continually fluctuates. Inner loop 710 attempts to maintain the received signal quality at or near the setpoint in the presence of changes in the communication channel.

Outer loop 720 is a (relatively) slower loop that continually adjusts the setpoint such that a particular level of performance is achieved for the data stream being power controlled. The desired level of performance is typically a particular target frame error rate (FER), packet error rate (PER), or some other performance criteria. For example, a 1% target FER may be used for the data stream.

The outer loop setpoint adjustment for a particular data stream is typically achieved by (1) receiving, demodulating, and decoding the data stream to recover the transmitted data (block 722), (2) determining the status of each received frame as being decoded correctly (good) or in error (erased) (also in block 722), and (3) adjusting the setpoint (block 724) based on the frame status (and possibly along with some other information indicative of the "goodness" of, or the confidence in, the decoded data). If a frame is decoded correctly, then the received signal quality is likely to be higher than necessary and the setpoint may be reduced slightly, which then causes inner loop 710 to reduce the transmit power for the data stream. Alternatively, if a frame is decoded in error, then the received signal quality is likely to be lower than necessary and the setpoint may be increased, which then causes inner loop 710 to increase the transmit power for the data stream.

By controlling the manner in which the channel's setpoint is adjusted, different power control characteristics and performance levels may be obtained. For example, the target FER may be achieved by properly selecting the amount of upward adjustment in the setpoint for a bad frame, the amount of downward adjustment for a good frame, the required elapsed time between successive increases in the setpoint, and so on. The target FER (i.e., the long-term FER) may be set as $\Delta D/(\Delta D+\Delta U)$, where $\Delta U$ is the amount of increase in the setpoint for an erased frame, and $\Delta D$ is the amount of decrease in the setpoint for a good frame. The absolute sizes for $\Delta U$ and $\Delta D$ also determine the responsiveness of the power control mechanism to sudden changes in the communication channel.

Figure 8:
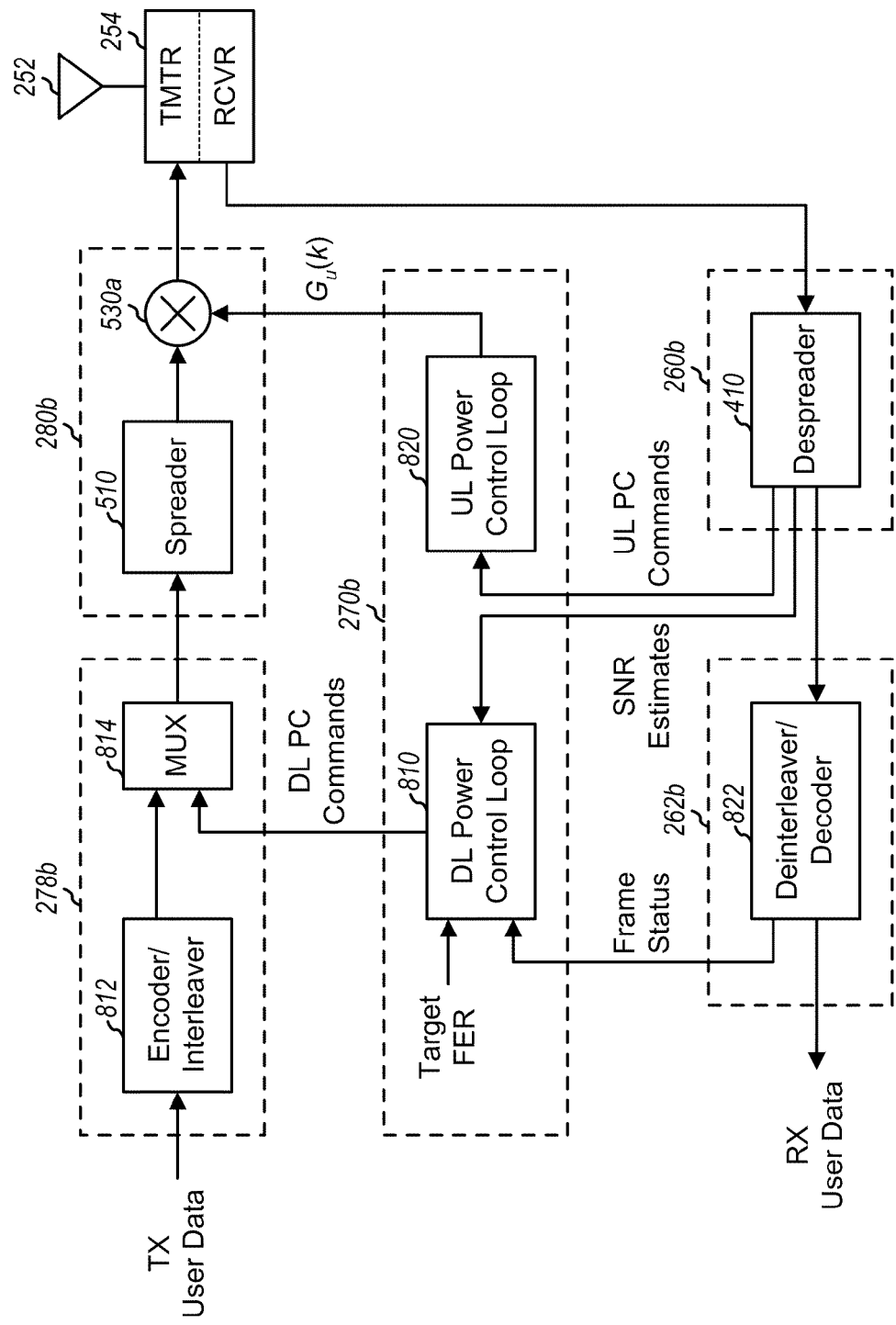
FIG. 8 is a block diagram of a specific embodiment of a portion of the downlink and uplink power control mechanisms implemented at a terminal.

FIG. 8 is a block diagram of a specific embodiment of a portion of the downlink and uplink power control mechanisms implemented at a terminal. In this embodiment, downlink and uplink power control loops 810 and 820 are used for downlink and uplink power control, respectively, for the terminal Power control loops 810 and 820 may be implemented within controller 270b, as shown in FIG. 8, or by some other units.

For downlink power control (DL PC), downlink power control loop 810 provides to a multiplexer 814 within TX data processor 278b DL PC commands used to control the transmit power of a downlink transmission to the terminal Multiplexer 814 also receives uplink coded data from an encoder/interleaver 812, multiplexes the DL PC commands with the coded data, and provides the multiplexed coded data and DL PC commands to spreader 510 within modulator 280b. The DL PC commands may be multiplexed with the coded data using various schemes such as, for example, by replacing some of the coded bits in accordance with a particular (e.g., pseudo-random) puncturing scheme.

Spreader 510 processes (e.g., spreads) the coded data and DL PC commands and provides modulated data. Multiplier 530a then scales the modulated data with the user's gain variable, $G_u(k)$. This gain variable, $G_u(k)$, controls the uplink transmit power and is adjusted by uplink power control loop 820. The scaled data is further processed by transmitter 254 to generate an uplink modulated signal, which is then transmitted to the serving cell/sector(s) with which the terminal is communicating.

At each serving cell/sector, the uplink modulated signal from the terminal is processed to recover the DL PC commands, which are then used to adjust the downlink transmit power to the terminal.

Also for the downlink power control, the downlink modulated signal(s) from the serving cell/sector(s) are received and processed (e.g., conditioned and digitized) by receiver 254, further processed (e.g., despread) by demodulator 260b, and decoded by RX data processor 262b. Demodulator 260b further estimates the SNR of the received demodulated data (or pilot) and provides the SNR estimates to downlink power control loop 810, which also receives from RX data processor 262b the status of each received frame. Downlink power control loop 810 may then adjust the downlink setpoint based on the target FER and the received frame status, and further provides DL PC commands based on the setpoint and the SNR estimates.

The SNR may be estimated at the receiver unit based on various techniques. Some of these techniques are described in U.S. Pat. No. 5,799,005, entitled "System and Method for Determining Received Pilot Power and Path Loss in a CDMA Communication System," issued Aug. 25, 1998, and U.S. Pat. No. 5,903,554, entitled "Method and Apparatus for Measuring Link Quality in a Spread Spectrum Communication System," issued May 11, 1999, both of which are incorporated herein by reference.

For uplink power control (UL PC), the UL PC commands transmitted by the serving cell/sector(s) are received, recovered, and demultiplexed by demodulator 260b, which then provides the commands to uplink power control loop 820. Loop 820 then determines an appropriate delta power value (e.g., +0.5 dB, −0.5 dB, zero, or some other value) corresponding to each received UL PC command, accumulates the delta power value with the current transmit power value, and provides the gain value, $G_u(k)$, corresponding to the updated transmit power value.

The power control for the downlink and uplink may each be implemented using the power control techniques described in the aforementioned U.S. Pat. Nos. 5,799,005 and 5,903,554, U.S. Pat. Nos. 5,056,109, and 5,265,119, both entitled "Method and Apparatus for Controlling Transmission Power in a CDMA Cellular Mobile Telephone System," respectively issued Oct. 8, 1991 and Nov. 23, 1993, and U.S. Pat. No. 6,097,972, entitled "Method and Apparatus for Processing Power Control Signals in CDMA Mobile Telephone System," issued Aug. 1, 2000, all of which are incorporated herein by reference.

Variable Rate

Variable rate data may be supported on the downlink and/or uplink via power scaling and spreading adjustment. If a spreading factor of SF is used for a data rate of $r_1$, then lower data rates may be accommodated by power scaling the data such that the transmit power per frame is proportional to the data rate. For example, if SF=128 for $r_1$=9.6 Kbps, then data rates of 1.2, 2.4, 4.8, and 9.6 Kbps (which may be produced by a vocoder) may be supported by (1) repeat coding by a factor of two for a 4.8 Kbps data rate frame and allocating half of the transmit power used for a 9.6 Kbps data rate frame, (2) repeat coding by a factor of four for a 2.4 Kbps data rate frame and allocating a quarter of the transmit power used for a 9.6 Kbps data rate frame, and (3) repeat coding by a factor of eight for a 1.2 Kbps data rate frame and allocating an eighth of the transmit power used for a 9.6 Kbps data rate frame.

Higher data rates may also be supported by reducing the spreading gain and scaling up the transmit power. In one embodiment, multiple spreading codes are allocated for higher data rates. Since the data is spread over all selected sub-bands by each spreading code, the full diversity afforded by the wideband channel is retained by the use of multiple spreading codes for higher data rates. In another embodiment, different fractional portions of the system bandwidth are allocated to different data symbols. For example, if one data symbol is transmitted over all M sub-bands for a data rate of 9.6 Kbps, then two data symbols may be transmitted over M sub-bands for a data rate of 19.2 Kbps by spreading each data symbol with a spreading code of half the length (M/2) and transmitting each spread data symbol over M/2 sub-bands. Each OFDM symbol would then include two data symbols, each having a length of M/2. The sub-bands may be allocated to the data symbols such that they are interleaved (e.g., odd-numbered sub-bands may be allocated to one data symbol and even-numbered sub-bands may be allocated to the other data symbol) or based on some other sub-band assignment scheme. For both embodiments, the highest data rate may be supported by allocating all available spreading codes to the user data.

As the data rate increases, the spreading may be reduced proportionately to accommodate the higher rate data. When the data rate reaches 1 bps/Hz, the spreading effectively disappears (i.e., is not used) and the resultant modulated output resembles the conventional OFDM scheme. Thus, the techniques described herein allow data to be modulated using a hybrid OFDM-CDMA scheme at lower data rates (i.e., less than 1 bps/Hz) or a pure OFDM scheme at higher data rates (i.e., 1 bps/Hz and beyond). In the pure OFDM scheme, the pilot is not spread but may be distributed in a subset of sub-bands, as described below.

Handoff

Soft and softer handoff may be supported by the system. On the downlink, a terminal may receive the pilots from a number of cells/sectors. If it is determined that the strength of the pilots from two or more cells/sectors is adequate to support soft/softer handoff operation, then the terminal may report to the current serving cell/sector(s) the new cell/sector(s) to add to the soft/softer handoff list. The newly added cell/sector(s) would then begin transmitting the same user data as the current serving cell/sector(s). The terminal would then receive the downlink modulated signals from all serving cell/sectors, demodulate each received signal, and combine the separate downlink transmissions. Soft combining may be used whereby the demodulated symbols from each serving cell/sector may be weighted by the received signal strength for the cell/sector prior to being combined with the weighted demodulated symbols from the other serving cell/sector(s).

On the uplink, the uplink modulated signal from a particular terminal may be received by multiple serving cells/sectors. Each serving cell/sector processes the uplink modulated signal and provides decoded data (or possibly demodulated data) to a central entity (e.g., a base station controller) responsible for frame selection and uplink power control. If the serving sectors belong to the same cell, then the demodulated data from the sectors may be (soft) combined prior decoding, which may provide improved performance for softer handoff. And if the serving sectors belong to different cells, then each sector may provide a decoded data frame for each frame interval to the central entity, which then selects the best frame as the decoded result. Alternatively, each serving sector may provide demodulated data to the central entity, which may then (soft) combine the demodulated data and perform the decoding.

For uplink power control in soft/softer handoff, the UL power control commands received at the terminal from multiple cells/sectors for each power control interval may be combined and used to adjust the uplink transmit power. An "OR-of-the-DOWNs" rule may be used whereby the terminal reduces its transmit power if any one of the UL power control commands requests a reduction in the transmit power.

For downlink power control in soft/softer handoff, the DL power control commands sent by the terminal are received at the serving cells/sectors, and each cell/sector adjust the downlink transmit power accordingly based on the received commands. The DL power control commands received by each serving cell/sector may also be provided to the central entity, which may (soft) combine these commands to provide improved estimates of the transmitted commands. The combined commands may then be sent to all serving cell/sector(s), each of which may then adjust the downlink transmit power to the terminal.

Various mechanisms and control features may be used to support soft/softer handoff. For example, mechanisms and control features may be provided to guide terminals in and out of handoff, including thresholds to add and drop cell/sector(s) from soft/softer handoff, timers to add/drop cell/sector(s), hysteresis to prevent a cell/sector from being alternately added and dropped due to fluctuating channel conditions, and so on.

Soft handoff is described in further detail in U.S. Pat. No. 5,101,501 entitled "Method and System for Providing a Soft Handoff in Communications in a CDMA Cellular Telephone System," issued Mar. 31, 1992, and U.S. Pat. No. 5,267,261, entitled "Mobile Station Assisted Soft Handoff in a CDMA Cellular Communications System," issued Nov. 30, 1993, both of which are incorporated herein by reference.

Pilot

As noted above, a pilot may be transmitted from a transmitter unit and used at the receiver units for various functions. Various pilot transmission schemes may be implemented and are within the scope of the disclosure.

In one pilot transmission scheme, pilot data is spread (e.g., in the frequency domain) with a known spreading code (e.g., Walsh code 0) and scaled with a particular gain. The spread pilot data may further be covered with a cover code (as shown in FIG. 3) or not covered at all (as shown in FIG. 5). If a unique cover code is used by each transmitter unit (e.g., each cell/sector), then the receiver units (e.g., the terminals) may be able to discriminate and distinguish the different transmitters of the pilots by their unique cover codes.

The cover codes for the transmitter units may be PN sequences generated based on a particular set of one or more polynomials but having different offsets, similar to the PN sequences used in IS-95 and cdma2000. For fast acquisition and synchronization, the length of the cover codes may be selected based on some defined relationship to the duration of a transmission symbol (if cyclic prefix is used) or the duration of an OFDM symbol (if cyclic prefix is not used). For example, the cover code length may be selected to be a multiple integer of the transmission symbol duration (if cyclic prefix is used) or a multiple integer of the OFDM symbol duration (if cyclic prefix is not used).

In another pilot transmission scheme, a subset of the available sub-bands is reserved and used to transmit pilot tones (i.e., no user data). The subset of sub-bands may be changed (i.e., hopped) in a deterministic manner or a pseudo-random manner to allow the entire channel response to be sampled over multiple OFDM symbols. The relationship between the sub-bands allocated for the pilot and the hopping pattern may be the same for all transmitter units (e.g., all cells/sectors). Alternative, each transmitter unit (e.g., each sector or cell) may be associated with a respective relationship between the allocated pilot sub-bands and hopping pattern, which may then be used to identify the transmitter unit.

In yet another pilot transmission scheme, pilot data may be time division multiplexed (TDM) with user and overhead data to implement a TDM pilot structure. In this case, the pilot may be time division multiplexed at fixed intervals with the other data (e.g., one pilot symbol for each NP data symbols), or may be multiplexed in a non-uniform manner (e.g., inserted at pseudo-randomly selected time intervals). The TDM pilot structure may also be implemented similar to that described in the IS-856 or W-CDMA standard.

In general, a pilot may be transmitted such that the receiver units are able to estimate the channel response for each sub-band used for data transmission.

Data Reception

Figure 9:
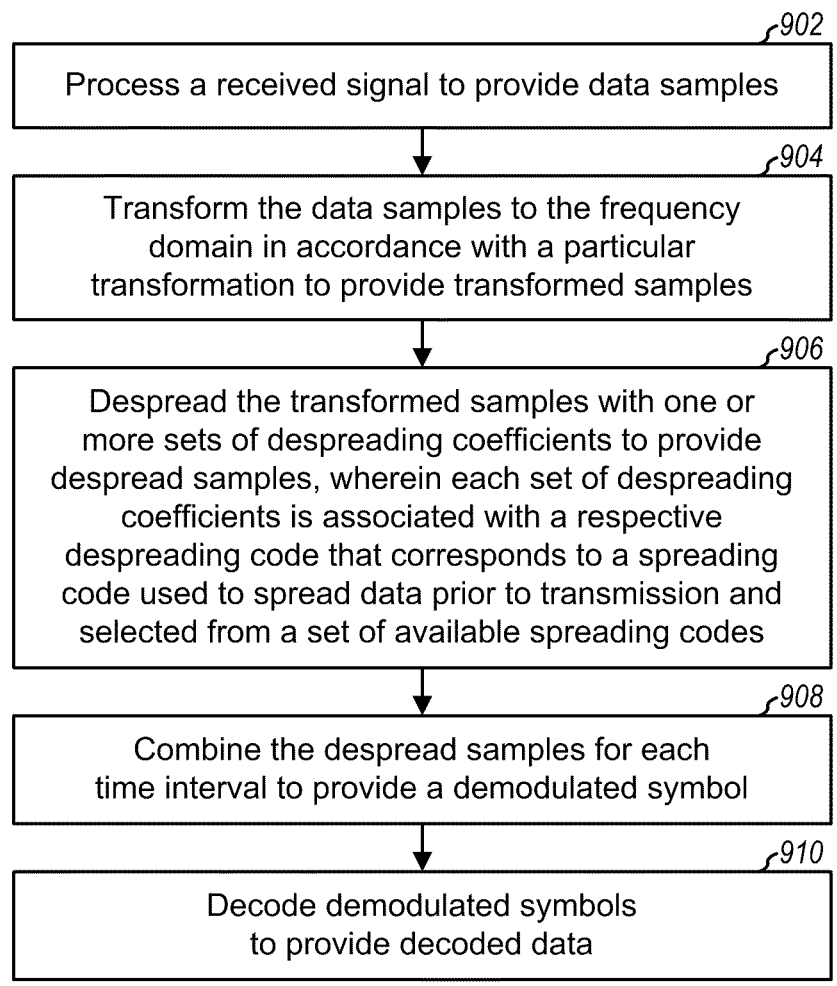
FIG. 9 illustrates example operations for recovering data in accordance with a specific embodiment.

FIG. 9 illustrates example operations for recovering data in accordance with a specific embodiment. The operations begin, at 902, by processing a received signal to provide data samples. At 904, the data samples are transformed to the frequency domain in accordance with a particular transformation to provide transformed samples. At 906, the transformed samples are despread with one or more sets of despreading coefficients to provide despread samples. Each set of despreading coefficients is associated with a respective despreading code that corresponds to a spreading code used to spread data prior to transmission and selected from a set of available spreading codes. At 908, the despread samples are combined for each time interval to provide a demodulated symbol. At 910, demodulated symbols are decoded to provide decoded data.

Figure 10:
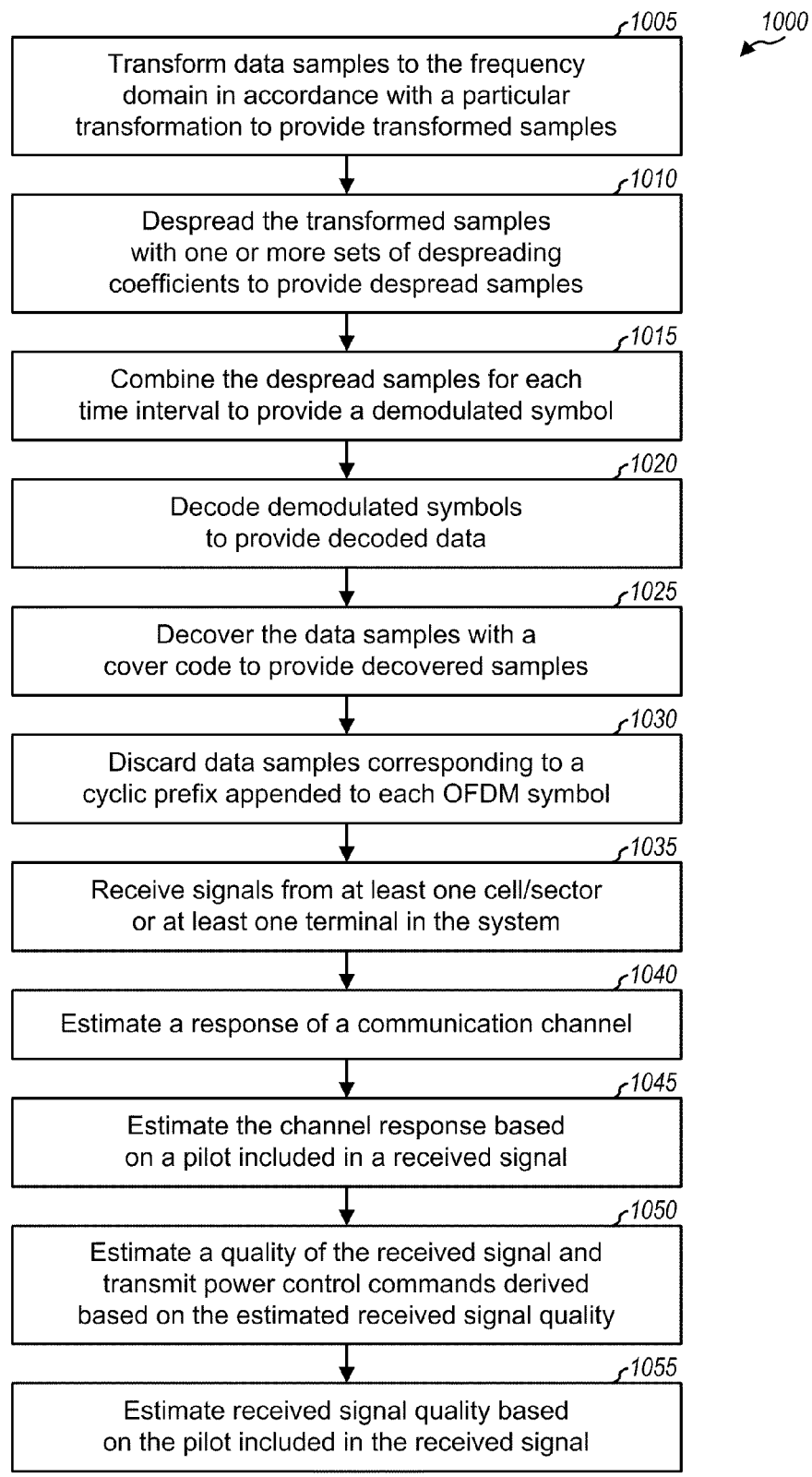
FIG. 10 illustrates example operations for recovering data in accordance with some embodiments.

FIG. 10 illustrates example operations (method 1000) for recovering data in accordance with some embodiments. The operations can begin by processing a received signal to provide data samples. At 1005, operations can include transforming the data samples to the frequency domain in accordance with a particular transformation to provide transformed samples. At 1010, operations can include despreading the transformed samples with one or more sets of despreading coefficients to provide despread samples. Each set of despreading coefficients is associated with a respective despreading code that corresponds to a spreading code used to spread data prior to transmission and selected from a set of available spreading codes. At 1015, operations can include combining the despread samples for each time interval to provide a demodulated symbol. At 1020, operations can also include decoding demodulated symbols to provide decoded data.

Other operation features can also be included in method 1000. For example, at 1025, operations can include decovering the data samples with a cover code to provide decovered samples, and the transforming in 1005 can be performed on the decovered samples. At 1030, operations can include discarding data samples corresponding to a cyclic prefix appended to each OFDM symbol. At 1035, operations can include receiving signals from at least one cell/sector or at least one terminal in the system. At 1040, operations can include estimating a response of a communication channel. Each set of despreading coefficients may be derived based in part on a set of weights indicative of the estimated channel response. At 1045, operations can include estimating the channel response based on a pilot included in a received signal. At 1050, operations can include estimating a quality of the received signal. Power control commands may be derived based on the estimated received signal quality and transmitted. At 1055, operations can include estimating received signal quality based on the pilot included in the received signal.

The modulation, demodulation, multiple-access, rate control, power control, soft/softer handoff, and other techniques described herein may be implemented by various means. For example, these techniques may be implemented in hardware, software, or a combination thereof. For a hardware implementation, the elements used to implement any one or a combination of the techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, any one or a combination of the techniques may be implemented with modules (e.g., procedures, functions, and so on) that perform the functions described herein. The software codes may be stored in a memory unit (e.g., memory 232 or 272 in FIG. 2) and executed by a processor (e.g., controller 230 or 270). The memory unit may be implemented within the processor or external to the processor, in which case it can be communicatively coupled to the processor via various means as it known in the art.

Headings are included herein for reference and to aid in locating certain sections. These heading are not intended to limit the scope of the concepts described therein under, and these concepts may have applicability in other sections throughout the entire specification.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communication, comprising:
spreading a modulation symbol with a spreading sequence to obtain a plurality of spread symbols;
transforming the plurality of spread symbols from frequency domain to time domain based on an inverse fast Fourier transform (IFFT) to obtain a plurality of time-domain samples; and
sending the plurality of time-domain samples via one or more antennas.

2. The method of claim 1, wherein the spreading the modulation symbol comprises multiplying the modulation symbol with a plurality of symbols of the spreading sequence to obtain the plurality of spread symbols, one spread symbol for each of the plurality of symbols of the spreading sequence.

3. A method for wireless communication, comprising:
spreading a modulation symbol with a spreading sequence to obtain a plurality of spread symbols;
transforming the plurality of spread symbols from frequency domain to time domain to obtain a plurality of time-domain samples;
appending a cyclic prefix to the plurality of time-domain samples prior to transmission; and
sending the plurality of time-domain samples via one or more antennas.

4. A method for wireless communication, comprising:
spreading a modulation symbol with a spreading sequence to obtain a plurality of spread symbols;
transforming the plurality of spread symbols from frequency domain to time domain to obtain a plurality of time-domain samples;
time division multiplexing the plurality of time-domain samples and a pilot; and
sending the plurality of time-domain samples via one or more antennas.

5. A method for wireless communication, comprising:
spreading a modulation symbol with a spreading sequence to obtain a plurality of spread symbols;
transforming the plurality of spread symbols from frequency domain to time domain to obtain a plurality of time-domain samples;
scaling the plurality of time-domain samples, or the plurality of spread symbols, or the modulation symbol based on a gain to obtain a target transmit power level; and
sending the plurality of time-domain samples via one or more antennas.

6. The method of claim 5, further comprising: receiving a power control command; and adjusting the gain based on the power control command.

7. The method of claim 1, wherein the spreading sequence is assigned to a terminal.

8. The method of claim 1, wherein the spreading sequence comprises a plurality of symbols of complex values.

9. An apparatus for wireless communication, comprising:
at least one processor configured to spread a modulation symbol with a spreading sequence to obtain a plurality of spread symbols and to transform the plurality of spread symbols from frequency domain to time domain based on an inverse fast Fourier transform (IFFT) to obtain a plurality of time-domain samples, and
at least one antenna associated with the at least one processor, wherein the at least one antenna is configured to send the plurality of time-domain samples.

10. The apparatus of claim 9, wherein the at least one processor is configured to multiply the modulation symbol with a plurality of symbols of the spreading sequence to obtain the plurality of spread symbols, one spread symbol for each of the plurality of symbols of the spreading sequence.

11. An apparatus for wireless communication, comprising:
at least one processor configured to spread a modulation symbol with a spreading sequence to obtain a plurality of spread symbols and to transform the plurality of spread symbols from frequency domain to time domain to obtain a plurality of time-domain samples,
wherein the at least one processor is configured to append a cyclic prefix to the plurality of time-domain samples prior to transmission, and
at least one antenna associated with the at least one processor, wherein the at least one antenna is configured to send the plurality of time-domain samples.

12. An apparatus for wireless communication, comprising:
at least one processor configured to spread a modulation symbol with a spreading sequence to obtain a plurality of spread symbols and to transform the plurality of spread symbols from frequency domain to time domain to obtain a plurality of time-domain samples,
wherein the at least one processor is configured to time division multiplex the plurality of time-domain samples and pilot, and
at least one antenna associated with the at least one processor, wherein the at least one antenna is configured to send the plurality of time-domain samples.

13. A computer program product, comprising:
a non-transitory computer-readable medium comprising:
code for causing at least one processor to spread a modulation symbol with a spreading sequence to obtain a plurality of spread symbols,
code for causing the at least one processor to transform the plurality of spread symbols from frequency domain to time domain based on an inverse fast Fourier transform (IFFT) to obtain a plurality of time-domain samples, and
code for causing the at least one processor to send the plurality of time-domain samples via one or more antennas.

14. A method for wireless communication, comprising:
receiving a plurality of time-domain samples via one or more antennas;
removing a cyclic prefix of the time-domain samples;
transforming the plurality of time-domain samples from time domain to frequency domain to obtain received symbols for subcarriers available for transmission after removing the cyclic prefix;
obtaining a plurality of received symbols for a plurality of subcarriers corresponding to a subset of the subcarriers available for transmission; and
despreading the plurality of received symbols based on a spreading sequence to obtain a despread symbol.

15. A method for wireless communication, comprising:
receiving a plurality of time-domain samples via one or more antennas;
transforming the plurality of time-domain samples from time domain to frequency domain to obtain received symbols for subcarriers available for transmission, wherein the transforming the plurality of time-domain samples comprises transforming the plurality of time-domain samples based on a fast Fourier transform (FFT) to obtain the received symbols for the subcarriers available for transmission;
obtaining a plurality of received symbols for a plurality of subcarriers corresponding to a subset of the subcarriers available for transmission; and
despreading the plurality of received symbols based on a spreading sequence to obtain a despread symbol.

16. The method of claim 14, wherein the despreading the plurality of received symbols comprises correlating the plurality of received symbols with a plurality of symbols determined based on the spreading sequence to obtain the despread symbol.

17. A method for wireless communication, comprising:
receiving a plurality of time-domain samples via one or more antennas;
time division demultiplexing the plurality of time-domain samples and a pilot;
transforming the plurality of time-domain samples from time domain to frequency domain to obtain received symbols for subcarriers available for transmission;
obtaining a plurality of received symbols for a plurality of subcarriers corresponding to a subset of the subcarriers available for transmission; and
despreading the plurality of received symbols based on a spreading sequence to obtain a despread symbol.

18. The method of claim 17, further comprising: determining a channel estimate based on the pilot; and despreading the plurality of received symbols based further on the channel estimate.

19. The method of claim 14, wherein the spreading sequence is assigned to a terminal.

20. The method of claim 14, wherein the spreading sequence comprises a plurality of symbols of complex values.

21. An apparatus for wireless communication, comprising:
at least one processor configured to remove a cyclic prefix prior to transforming a plurality of time-domain samples from time domain to frequency domain to obtain received symbols for subcarriers available for transmission, to obtain a plurality of received symbols from a plurality of subcarriers corresponding to a subset of the subcarriers available for transmission, and to despread the plurality of received symbols based on a spreading sequence to obtain a despread symbol; and
one or more antennas configured to receive and/or transmit the time domain samples and configured to be electrically coupled to the at least one processor.

22. An apparatus for wireless communication, comprising:
at least one processor configured to transform a plurality of time-domain samples from time domain to frequency domain to obtain received symbols for subcarriers available for transmission, to transform the plurality of time-domain samples based on a fast Fourier transform (FFT) to obtain the received symbols for the subcarriers available for transmission, and to despread the plurality of received symbols based on a spreading sequence to obtain a despread symbol; and
one or more antennas configured to receive and/or transmit the time domain samples and configured to be electrically coupled to the at least one processor.

23. The apparatus of claim 21, wherein the at least one processor is configured to correlate the plurality of received symbols with a plurality of symbols determined based on the spreading sequence to obtain the despread symbol.

24. An apparatus for wireless communication, comprising:
at least one processor is configured to time division demultiplex a plurality of time-domain samples and a pilot, to transform the plurality of time-domain samples from time domain to frequency domain to obtain received symbols for subcarriers available for transmission, to obtain a plurality of received symbols from a plurality of subcarriers corresponding to a subset of the subcarriers available for transmission, and to despread the plurality of received symbols based on a spreading sequence to obtain a despread symbol; and
one or more antennas configured to receive and/or transmit the time domain samples and configured to be electrically coupled to the at least one processor.

25. A computer program product, comprising:
a non-transitory computer-readable medium comprising:
code for causing at least one processor to remove a cyclic prefix prior to transforming a plurality of time-domain samples from time domain to frequency domain to obtain received symbols for subcarriers available for transmission,
code for causing the at least one processor to obtain a plurality of received symbols for a plurality of subcarriers corresponding to a subset of the subcarriers available for transmission, and
code for causing the at least one processor to despread the plurality of received symbols based on a spreading sequence to obtain a despread symbol.

26. A method for wireless communication, comprising:
generating modulation symbols comprising data multiplexed with control, wherein the generating comprises multiplexing power control commands with data;
spreading the modulation symbols with a spreading sequence to obtain a plurality of spread symbols;
transforming the plurality of spread symbols from frequency domain to time domain to obtain a plurality of time-domain samples; and
sending the plurality of time-domain samples via one or more antennas.

27. The method of claim 26, wherein the power control commands comprises downlink power control commands and the data comprises uplink data.

28. An apparatus for wireless communication, comprising:
one or more antennas;
at least one processor configured to generate modulation symbols comprising data multiplexed with control by multiplexing power control commands with data, spread the modulation symbols with a spreading sequence to obtain a plurality of spread symbols, transform the plurality of spread symbols from frequency domain to time domain to obtain a plurality of time-domain samples; and
a transmitter configured to send the plurality of time-domain samples via one or more antennas.

29. The apparatus of claim 28, wherein the power control commands comprises downlink power control commands and the data comprises uplink data.

30. A computer program product, comprising:
a non-transitory computer-readable medium comprising:
code for causing at least one processor to generate modulation symbols comprising data multiplexed with control, wherein the code for causing at least one processor to generate comprises code for multiplexing power control commands with data;
code for causing the at least one processor to spread the modulation symbols with a spreading sequence to obtain a plurality of spread symbols;
code for the at least one processor to transform the plurality of spread symbols from frequency domain to time domain to obtain a plurality of time-domain samples; and
code for causing the at least one processor to send the plurality of time-domain samples via one or more antennas.

31. The computer program product of claim 30, wherein the power control commands comprises downlink power control commands and the data comprises uplink data.

32. A method for wireless communication, comprising:
receiving a plurality of time-domain samples via one or more antennas, wherein the time-domain samples contain modulation symbols comprising data multiplexed with control, and wherein the received time-domain samples are power control commands multiplexed with data;
transforming the plurality of time-domain samples from time domain to frequency domain to obtain received symbols for subcarriers available for transmission;
obtaining a plurality of received symbols for a plurality of subcarriers corresponding to a subset of the subcarriers available for transmission; and
despreading the plurality of received symbols based on a spreading sequence to obtain a despread symbol.

33. The method of claim 32, wherein the power control commands comprises downlink power control commands and the data comprises uplink data.

34. An apparatus for wireless communication, comprising:
a receiver configured to receive a plurality of time-domain samples, via one or more antennas, wherein the time-domain samples contain modulation symbols comprising data multiplexed with control, and wherein the received time-domain samples are power control commands multiplexed with data; and
at least one processor configured to transform the plurality of time-domain samples from time domain to frequency domain to obtain received symbols for subcarriers available for transmission, obtain a plurality of received symbols for a plurality of subcarriers corresponding to a subset of the subcarriers available for transmission, and despread the plurality of received symbols based on a spreading sequence to obtain a despread symbol.

35. The apparatus of claim 34, wherein the power control commands comprises downlink power control commands and the data comprises uplink data.

36. A computer program product, comprising:
a non-transitory computer-readable medium comprising:
code for causing at least one processor to receive a plurality of time-domain samples via one or more antennas, wherein the time-domain samples contain modulation symbols comprising data multiplexed with control, and wherein the received time-domain samples are power control commands multiplexed with data;
code for causing the at least one processor to transform the plurality of time-domain samples from time domain to frequency domain to obtain received symbols for subcarriers available for transmission;
code for causing the at least one processor to obtain a plurality of received symbols for a plurality of subcarriers corresponding to a subset of the subcarriers available for transmission; and code for causing the at least one processor to despread the plurality of received symbols based on a spreading sequence to obtain a despread symbol.

37. The computer program product of claim 36, wherein the power control commands comprises downlink power control commands and the data comprises uplink data.

* * * * *